United States Patent
Yang et al.

(10) Patent No.: US 11,909,679 B2
(45) Date of Patent: Feb. 20, 2024

(54) METHOD AND DEVICE FOR TRANSMITTING/RECEIVING SIGNALS IN WIRELESS COMMUNICATION SYSTEM

(71) Applicant: LG ELECTRONICS INC., Seoul (KR)

(72) Inventors: Suckchel Yang, Seoul (KR); Seonwook Kim, Seoul (KR); Duckhyun Bae, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 17/961,441

(22) Filed: Oct. 6, 2022

(65) Prior Publication Data

US 2023/0067736 A1 Mar. 2, 2023

Related U.S. Application Data

(63) Continuation of application No. PCT/KR2022/000319, filed on Jan. 7, 2022.

(30) Foreign Application Priority Data

| Jan. 15, 2021 | (KR) | .......................... 10-2021-0006219 |
| Aug. 5, 2021 | (KR) | .......................... 10-2021-0103334 |
| Nov. 5, 2021 | (KR) | .......................... 10-2021-0151754 |

(51) Int. Cl.
*H04L 5/00* (2006.01)
*H04L 1/1812* (2023.01)

(52) U.S. Cl.
CPC .......... *H04L 5/0044* (2013.01); *H04L 1/1812* (2013.01); *H04L 5/0055* (2013.01)

(58) Field of Classification Search
CPC combination set(s) only.
See application file for complete search history.

(56) References Cited

U.S. PATENT DOCUMENTS

| 2014/0003452 | A1* | 1/2014 | Han ...................... H04L 1/1657 |
| | | | 370/474 |
| 2019/0239216 | A1 | 8/2019 | Kundu et al. |
| 2019/0342878 | A1 | 11/2019 | Kim et al. |
| 2021/0092763 | A1* | 3/2021 | Li .......................... H04L 1/0026 |
| 2021/0105766 | A1* | 4/2021 | Wang .................. H04W 72/569 |
| 2022/0116953 | A1* | 4/2022 | Kim ...................... H04L 1/1861 |
| 2022/0217709 | A1* | 7/2022 | Yang ..................... H04L 1/0025 |
| 2022/0217736 | A1* | 7/2022 | Taherzadeh Boroujeni ................ |
| | | | H04L 5/0094 |
| 2022/0225360 | A1* | 7/2022 | Yi ......................... H04W 72/23 |

OTHER PUBLICATIONS

LG Electronics, "Discussion on Intra-UE multiplexing/prioritization", 3GPP TSG RAN WG1 #102-e, Aug. 17-28, 2020, R1-2006317.

(Continued)

*Primary Examiner* — Hanh N Nguyen
(74) *Attorney, Agent, or Firm* — BRYAN CAVE LEIGHTON PAISNER LLP

(57) ABSTRACT

A terminal according to one embodiment of the present disclosure can encode a plurality of UCIs comprising a first UCI and a second UCI which have different priorities, perform resource mapping on the encoded bits of the plurality of UCIs on a single physical uplink channel, and perform uplink transmission on the basis of the resource mapping.

12 Claims, 11 Drawing Sheets

(56) References Cited

OTHER PUBLICATIONS

LG Electronics, "Discussion on Intra-UE multiplexing/prioritization", 3GPP TSG RAN WG1 #103-e, Oct. 26-Nov. 13, 2020, R1-2008060.

Intel Corporation, "On Intra-UE Multiplexing and Prioritization for Release 17 URLLC/IIoT", 3GPP TSG RAN WG1 Meeting #103-E, Oct. 26-Nov. 13, 2020, R1-2008987.

* cited by examiner

METHOD AND DEVICE FOR TRANSMITTING/RECEIVING SIGNALS IN WIRELESS COMMUNICATION SYSTEM

This application is the Continuation Bypass of International Application No. PCT/KR2022/000319, filed on Jan. 7, 2022, which claims the benefit of Korean Application No. 10-2021-0006219, filed on Jan. 15, 2021, Korean Application No. 10-2021-0103334, filed on Aug. 5, 2021, and Korean Application No. 10-2021-0151754, filed on Nov. 5, 2021, the contents of which are all hereby incorporated by reference herein in their entirety.

TECHNICAL FIELD

The present disclosure relates to a wireless communication system, and more particularly, to a method and apparatus for transmitting/receiving an uplink/downlink wireless signal in a wireless communication system.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

In an aspect of the present disclosure, there is provided a method of transmitting a signal by a user equipment (UE) in a wireless communication system. The method may include: encoding a plurality of UCIs (uplink control informations) including a first type of UCI and a second type of UCI; performing resource mapping of encoded bits of the plurality of UCIs on a single physical uplink channel; and performing uplink transmission based on the resource mapping. The UE may be configured to multiplex the plurality of UCIs on the single physical uplink channel even though the first type of UCI and the second type of UCI have different priorities. Based on the first type of UCI including a configured grant UCI (CG-UCI) for a configured grant (CG) operation in a shared spectrum, the second UCI including a hybrid automatic repeat request-acknowledgement (HARQ-ACK), and the CG-UCI and the HARQ-ACK having different priorities, the UE may be configured to: (i) perform the encoding for each of the CG-UCI and the HARQ-ACK; and (ii) perform the resource mapping for each of the CG-UCI and the HARQ-ACK.

When a second priority higher than a first priority is assigned to the single physical uplink channel, the UE may be configured to first determine a number of resources to be allocated to the CG-UCI and then determine a number of resources to be allocated to the HARQ-ACK among remaining resources. For example, based on the CG-UCI being less than or equal to 2 bits, the UE may be configured to perform resource mapping for the HARQ-ACK on remaining resources except for reserved resources and perform resource mapping for the CG-UCI by puncturing on the reserved resources. For example, based on the CG-UCI being more than 2 bits, the UE may be configured to perform resource mapping for the HARQ-ACK after performing resource mapping for the CG-UCI.

When a first priority lower than a second priority is assigned to the single physical uplink channel, the UE may be configured to first determine a number of resources to be allocated to the HARQ-ACK and then determine a number of resources to be allocated to the CG-UCI among remaining resources. For example, based on the HARQ-ACK being less than or equal to 2 bits, the UE may be configured to perform resource mapping for the CG-UCI on remaining resources except for reserved resources and perform resource mapping for the HARQ-ACK by puncturing on the reserved resources. For example, based on the HARQ-ACK being more than 2 bits, the UE may be configured to perform resource mapping for the CG-UCI after performing resource mapping for the HARQ-ACK.

The single physical uplink channel may be a configured grant physical uplink shared channel (CG-PUSCH), and a priority of the CG-PUSCH may be different from a priority of the HARQ-ACK.

Joint encoding of the CG-UCI and the HARQ-ACK having the different priorities and multiplexed on the single physical uplink channel may not be allowed. For example, the CG-UCI may be jointly encoded with a specific HARQ-ACK having a same priority as the CG-UCI, and a result of the joint encoding and the HARQ-ACK included in the second type of UCI may be separately encoded.

In another aspect of the present disclosure, there is provided a processor-readable storage medium configured to store a program for executing the above-described signal transmission method.

In another aspect of the present disclosure, there is provided a UE configured to perform the above-described signal transmission method In another aspect of the present disclosure, there is provided a device configured to control a UE performing the above-described signal transmission method In another aspect of the present disclosure, there is provided a method of receiving a signal by a base station in a wireless communication system. The method may include: receiving encoded bits of a plurality of UCIs multiplexed on a single physical uplink channel from a UE; and obtaining a first type of UCI and a second type of UCI by decoding the encoded bits of the plurality of UCIs. The base station may be configured to configure the UE to multiplex the plurality of UCIs on the single physical uplink channel even though the first type of UCI and the second type of UCI have different priorities. Based on the first type of UCI including CG-UCI for CG operation in a shared spectrum, the second UCI including a HARQ-ACK, and the CG-UCI and the HARQ-ACK having different priorities, the base station may be configured to: determine resource mapping for each of the CG-UCI and the HARQ-ACK; and perform the decoding for each of the CG-UCI and the HARQ-ACK based on the determined resource mapping.

In a further aspect of the present disclosure, there is provided a base station configured to perform the above-described signal reception method.

Advantageous Effects

According to the present disclosure, wireless signal transmission and reception may be efficiently performed in a wireless communication system.

It will be appreciated by persons skilled in the art that the effects that can be achieved with the present disclosure are not limited to what has been particularly described hereinabove and other advantages of the present disclosure will be more clearly understood from the following detailed description taken in conjunction with the accompanying drawings.

DESCRIPTION OF DRAWINGS

The accompanying drawings, which are included to provide a further understanding of the disclosure and are incorporated in and constitute a part of this application, illustrate embodiments of the disclosure and together with the description serve to explain the principle of the disclosure. In the drawings.

MODE FOR INVENTION

Figure 1:
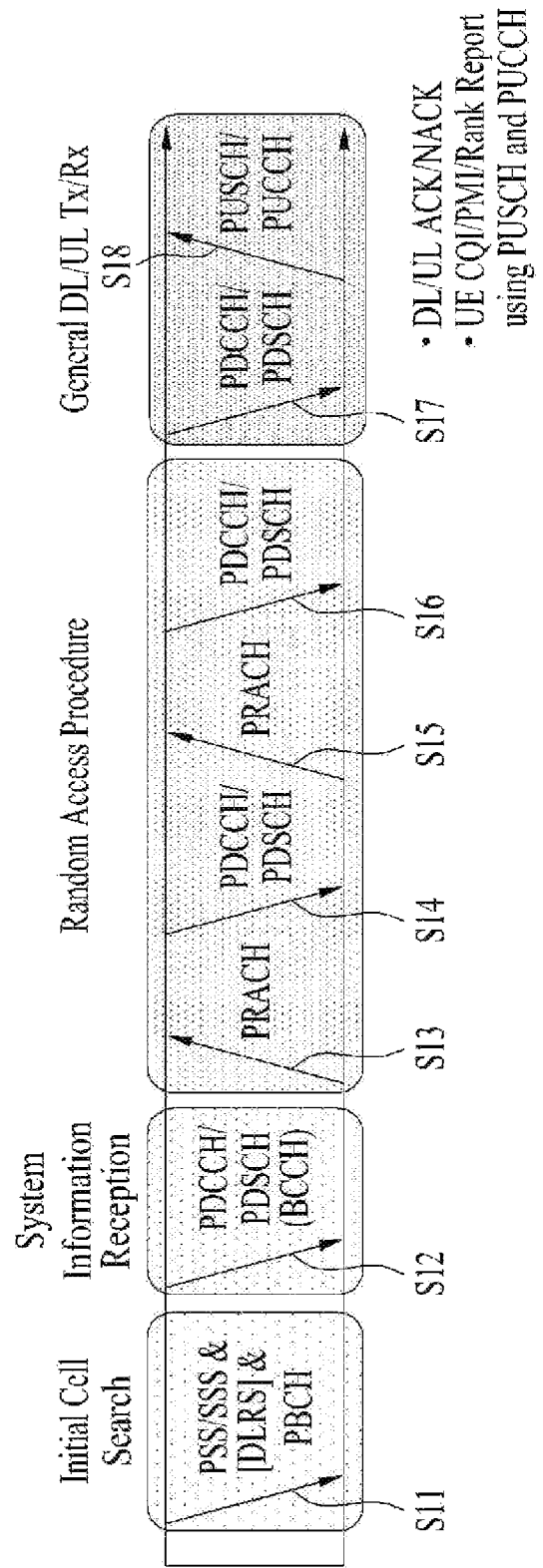
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In the present disclosure, for simplicity, this technology will be referred to as NR (New Radio or New RAT).

For the sake of clarity, 3GPP NR is mainly described, but the technical idea of the present disclosure is not limited thereto.

In the present disclosure, the term "set/setting" may be replaced with "configure/configuration", and both may be used interchangeably. Further, a conditional expression (e.g., "if", "in a case", or "when") may be replaced by "based on that" or "in a state/status". In addition, an operation or software/hardware (SW/HW) configuration of a user equipment (UE)/base station (BS) may be derived/understood based on satisfaction of a corresponding condition. When a process on a receiving (or transmitting) side may be derived/understood from a process on the transmitting (or receiving) side in signal transmission/reception between wireless communication devices (e.g., a BS and a UE), its description may be omitted. Signal determination/generation/encoding/transmission of the transmitting side, for example, may be understood as signal monitoring reception/decoding/determination of the receiving side. Further, when it is said that a UE performs (or does not perform) a specific operation, this may also be interpreted as that a BS expects/assumes (or does not expect/assume) that the UE performs the specific operation. When it is said that a BS performs (or does not perform) a specific operation, this may also be interpreted as that a UE expects/assumes (or does not expect/assume) that the BS performs the specific operation. In the following description, sections, embodiments, examples, options, methods, schemes, and so on are distinguished from each other and indexed, for convenience of description, which does not mean that each of them necessarily constitutes an independent disclosure or that each of them should be implemented only individually. Unless explicitly contradicting each other, it may be derived/understood that at least some of the sections, embodiments, examples, options, methods, schemes, and so on may be implemented in combination or may be omitted.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
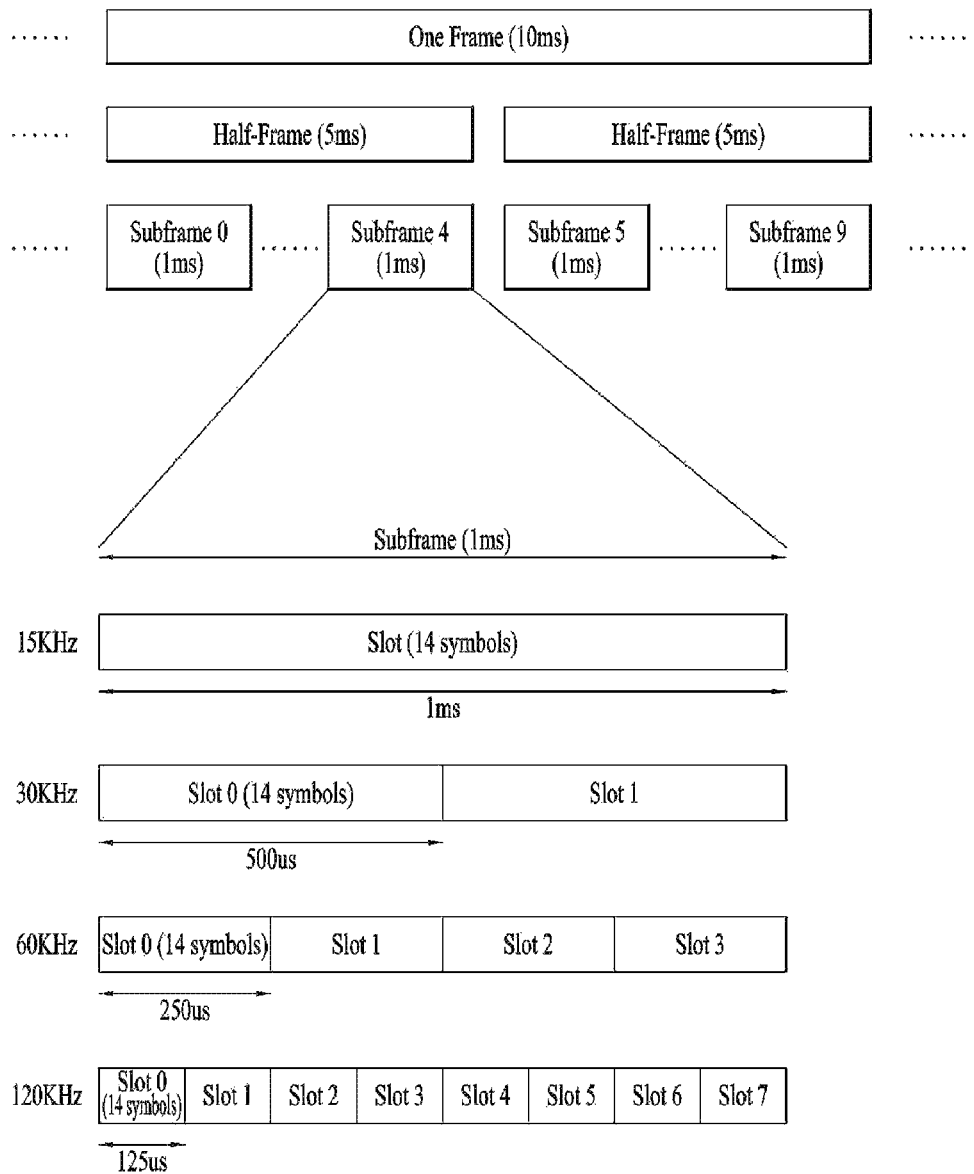
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame,u}_{slot}$: Number of slots in a frame
$N^{subframe,u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
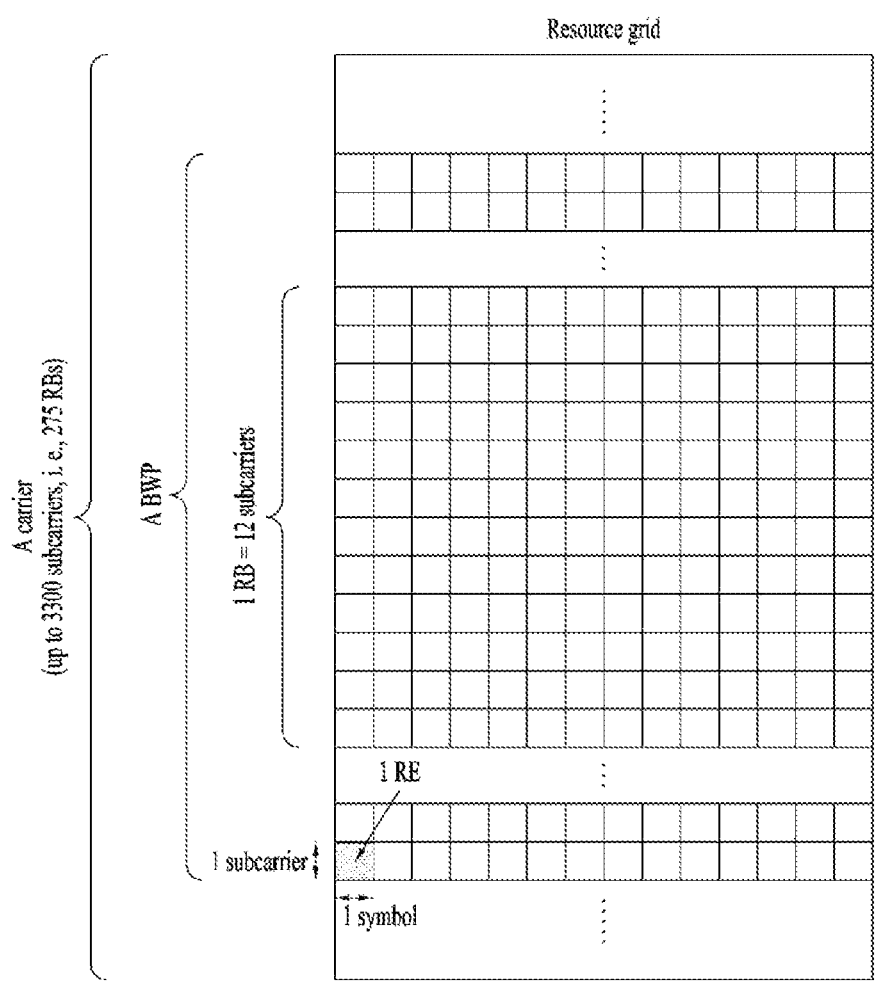
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain. A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
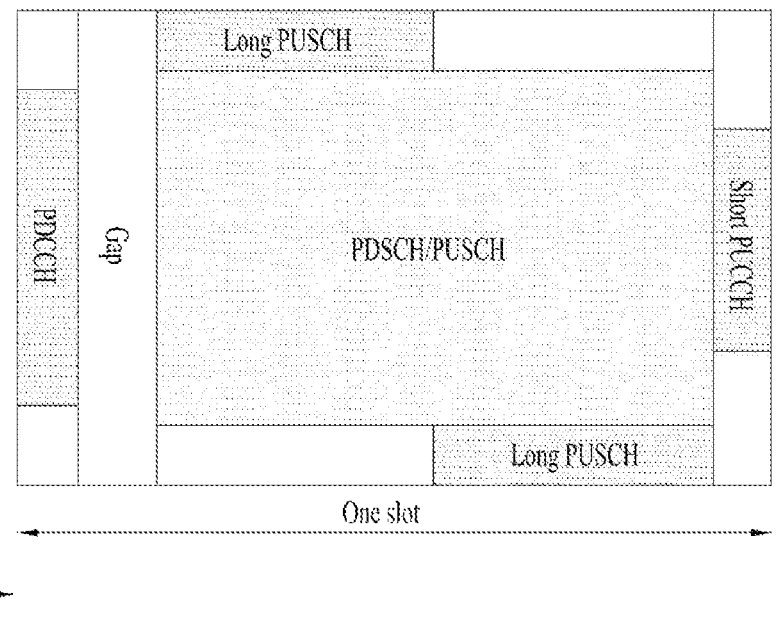
FIG. 4 illustrates exemplary mapping of physical channels in a slot.

FIG. 4 illustrates exemplary mapping of physical channels in a slot. A PDCCH may be transmitted in a DL control region, and a PDSCH may be transmitted in a DL data region. A PUCCH may be transmitted in a UL control region, and a PUSCH may be transmitted in a UL data region. A guard period (GP) provides a time gap for transmission mode-to-reception mode switching or reception mode-to-transmission mode switching at a BS and a UE. Some symbol at the time of DL-to-UL switching in a subframe may be configured as a GP.

Each physical channel will be described below in greater detail.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

The PDCCH includes 1, 2, 4, 8, or 16 control channel elements (CCEs) according to its aggregation level (AL). A CCE is a logical allocation unit used to provide a PDCCH with a specific code rate according to a radio channel state. A CCE includes 6 resource element groups (REGs), each REG being defined by one OFDM symbol by one (P)RB. The PDCCH is transmitted in a control resource set (CORESET). A CORESET is defined as a set of REGs with a given numerology (e.g., an SCS, a CP length, and so on). A plurality of CORESETs for one UE may overlap with each other in the time/frequency domain. A CORESET may be configured by system information (e.g., a master information block (MIB)) or UE-specific higher-layer signaling (e.g., radio resource control (RRC) signaling). Specifically, the number of RBs and the number of symbols (3 at maximum) in the CORESET may be configured by higher-layer signaling.

For PDCCH reception/detection, the UE monitors PDCCH candidates. A PDCCH candidate is CCE(s) that the UE should monitor to detect a PDCCH. Each PDCCH candidate is defined as 1, 2, 4, 8, or 16 CCEs according to an AL. The monitoring includes (blind) decoding PDCCH candidates. A set of PDCCH candidates decoded by the UE are defined as a PDCCH search space (SS). An SS may be a common search space (CSS) or a UE-specific search space (USS). The UE may obtain DCI by monitoring PDCCH candidates in one or more SSs configured by an MIB or higher-layer signaling. Each CORESET is associated with one or more SSs, and each SS is associated with one CORESET. An SS may be defined based on the following parameters.

controlResourceSetId: A CORESET related to an SS.

monitoringSlotPeriodicityAndOffset: A PDCCH monitoring periodicity (in slots) and a PDCCH monitoring offset (in slots).

monitoringSymbolsWithinSlot: PDCCH monitoring symbols in a slot (e.g., the first symbol(s) of a CORESET).

nrofCandidates: The number of PDCCH candidates (one of 0, 1, 2, 3, 4, 5, 6, and 8) for each AL={1, 2, 4, 8, 16}.

An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
| --- | --- | --- | --- |
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
| --- | --- |
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword.

The PDSCH may deliver up to two codewords. Scrambling and modulation mapping may be performed on a codeword basis, and modulation symbols generated from each codeword may be mapped to one or more layers. Each layer together with a demodulation reference signal (DMRS) is mapped to resources, and an OFDM symbol signal is generated from the mapped layer with the DMRS and transmitted through a corresponding antenna port.

The PUCCH delivers uplink control information (UCI). The UCI includes the following information.

SR(Scheduling Request): Information used to request UL-SCH resources.

HARQ (Hybrid Automatic Repeat reQuest)-ACK (Acknowledgement): A response to a DL data packet (e.g., codeword) on the PDSCH. An HARQ-ACK indicates whether the DL data packet has been successfully received. In response to a single codeword, a 1-bit of HARQ-ACK may be transmitted. In response to two codewords, a 2-bit HARQ-ACK may be transmitted. The HARQ-ACK response includes positive ACK (simply, ACK), negative ACK (NACK), discontinuous transmission (DTX) or NACK/DTX. The term HARQ-ACK is interchangeably used with HARQ ACK/NACK and ACK/NACK.

CSI (Channel State Information): Feedback information for a DL channel. Multiple input multiple output (MIMO)-related feedback information includes an RI and a PMI.

Table 5 illustrates exemplary PUCCH formats. PUCCH formats may be divided into short PUCCHs (Formats 0 and 2) and long PUCCHs (Formats 1, 3, and 4) based on PUCCH transmission durations.

TABLE 5

| PUCCH format | Length in OFDM symbols $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the BS by transmitting one of a plurality of sequences on a PUCCH of PUCCH format 0. Only when the UE transmits a positive SR, the UE transmits the PUCCH of PUCCH format 0 in PUCCH resources for a corresponding SR configuration.

PUCCH format 1 conveys UCI of up to 2 bits and modulation symbols of the UCI are spread with an orthogonal cover code (OCC) (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 2-symbol PUCCH format 2, frequency hopping may be activated.

PUCCH format 3 does not support UE multiplexing in the same PRBS, and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBS, and conveys UCI of more than 2 bits. In other words, PUCCH resources of PUCCH format 3 include an OCC. Modulation symbols are transmitted in TDM with the DMRS.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or Layer 1 (L1) signaling such as a PDCCH) (configured scheduling or configured grant). The PUSCH transmission may be performed in a codebook-based or non-codebook-based manner.

Figure 5:
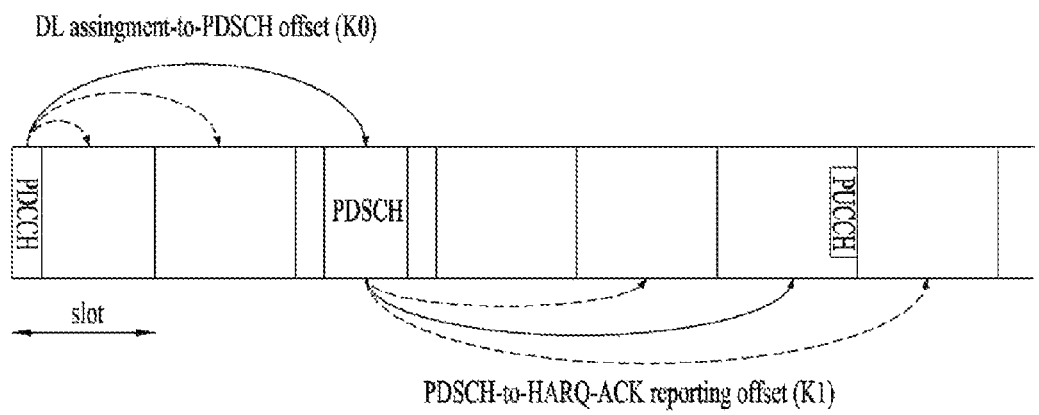
FIG. 5 illustrates an exemplary acknowledgment/negative acknowledgment (ACK/NACK) transmission process.

FIG. 5 illustrates an exemplary ACK/NACK transmission process. Referring to FIG. 5, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 5 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bitwise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 6:
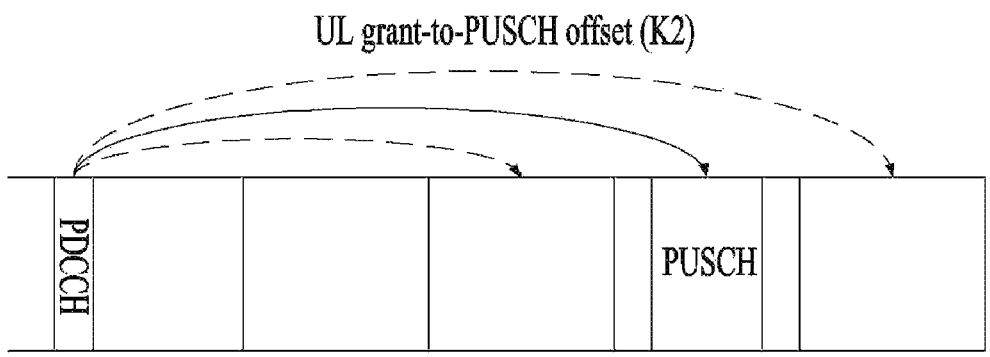
FIG. 6 illustrates an exemplary physical uplink shared channel (PUSCH) transmission process.

FIG. 6 illustrates an exemplary PUSCH transmission procedure. Referring to FIG. 6, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Figure 7:
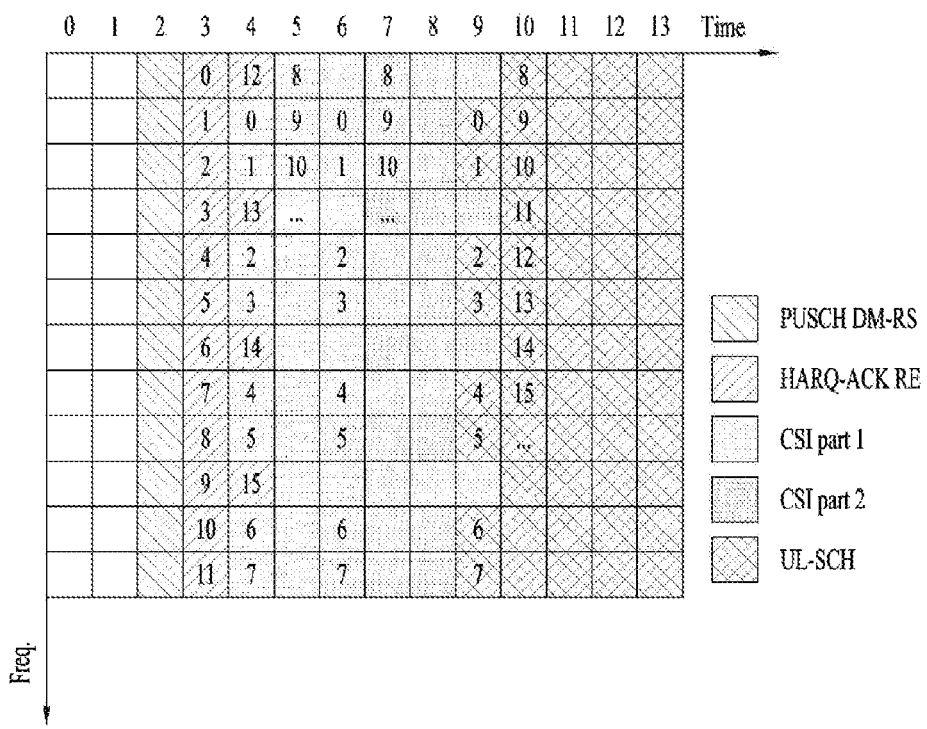
FIG. 7 illustrates an example of multiplexing control information in a PUSCH.

FIG. 7 illustrates exemplary multiplexing of UCI in a PUSCH. When a plurality of PUCCH resources overlap with a PUSCH resource in a slot and a PUCCH-PUSCH simultaneous transmission is not configured in the slot, UCI may be transmitted on a PUSCH (UCI piggyback or PUSCH piggyback), as illustrated. In the illustrated case of FIG. 7, an HARQ-ACK and CSI are carried in a PUSCH resource.

For piggyback of an HARQ-ACK to a PUSCH in NR Rel.16, when the payload of the HARQ-ACK is 2 or fewer bits, PUSCH data REs (and/or CSI part 2 REs) are punctured, and when the payload of the HARQ-ACK is more than 2 hits, rate-matching is performed. Table 6 describes HARQ-ACK rate matching of UCI in TS38.212.

In Table 6, a beta offset '$\beta_{offset}^{PUSCH}$', which is a weight for rate-matching of UCI on a PUSCH, is related to the amount of resources to be used for an HARQ-ACK and a CSI report during PUSCH transmission. A $\beta_{offset}$ set s may be configured by higher-layer signaling. A specific set may be used semi-statically, or a $\beta_{offset}$ set may be indicated dynamically by DCI (e.g., DCI format 0_1/0_2). In the dynamic $\beta_{offset}$ indication scheme, a beta offset indication field of DCI includes two bits indicating one of four $\beta_{offset}$ sets configured for a UE. Each $\beta_{offset}$ set includes three $\beta_{offset}$ values applicable to an HARQ-ACK, two $\beta_{offset}$ values for CSI Part 1, and two $\beta_{offset}$ values for CSI Part 2, and a specific $\beta_{offset}$ is selected according to a corresponding payload size. For example, a first $\beta_{offset}^{HARQ-ACK}$ value may be used to transmit M HARQ-ACKs on the PUSCH, and a second $\beta_{offset}^{HARQ-ACK}$ value may be used to transmit N HARQ-ACKs on the PUSCH.

NR-Shared Spectrum/Unlicensed Band (NR-U) Operation

A communication node (e.g., BS, UE) in unlicensed bands needs to determine whether the channel is used by other communication nodes before signal transmission.

Definitions of terms related to NR-U operation:

Channel: The channel may be composed of consecutive RBs in which a channel access procedure is performed in a shared spectrum. The channel may refer to a carrier or a part of a carrier.

Channel Access Procedure (CAP): The CAP refers to a procedure for evaluating channel availability based on sensing in order to determine whether other communication nodes use a channel before signal transmission. The CAP may be referred to as Listen-Before-Talk (LBT).

Channel occupancy: Channel occupancy means transmission(s) on channel(s) by the BS/UE after the CAP is performed.

Channel Occupancy Time (COT): The COT refers to the total time for which the BS/UE and any BS/UE(s) that share channel occupancy may perform transmission(s) on channel(s) after the BS/UE performs the CAP. When the COT is determined, if the transmission gap is 25 us or less, the gap period is also counted in the COT. The COT may be shared for transmission between the BS and corresponding UE(s).

If a sub-band (SB) in which independent LBT is performed is defined as an LBT-SB, a plurality of LBT-SBs may be included in one wideband cell/BWP. A set of RBs included in the LBT-SB may be configured by higher layer (e.g., RRC) signaling. Therefore, depending on (i) the BW of a cell/BWP and (ii) RB set allocation information, one cell/BWP may include one or more LBT-SBs, or a plurality of LBT-SBs may be included in the BWP of a carrier. The LBT-SB may have, for example, a band of 20 MHz. The LBT-SB may include a plurality of consecutive (P)RBs in the frequency domain, and thus, the LBT-SB may be referred to as a (P)RB set. Although not shown, a guard hand (GB) may be included between LBT-SBs. Thus, the BWP may be configured as follows: {LBT-SB #0 (RB set #0)+GB #0+LBT-SB #1 (RB set #1+GB #1)+ ... +LBT-SB #(K-1) (RB set (#K-1))}. For convenience, LBT-SB/RB indexing may be configured/defined such that the indexing starts from the lowest frequency band and increases as the frequency band increases.

(1) Type 1 CAP Method

For a DL Type 1 CAP, the BS may sense whether a channel is idle for sensing slot durations of a defer duration $T_d$. Then, if a counter N is zero, the BS may perform transmission. For a UL Type 1 CAP, the UE may sense whether a channel is idle for sensing slot durations of a defer duration $T_d$. Then, if a counter N is zero, the UE may perform transmission. In this case, the counter N may be adjusted by sensing the channel for additional sensing slot durations(s) according to the following process:

Step 1) N is set to $N_{init}(N=N_{init})$, where $N_{init}$ is a random number uniformly distributed between 0 and $CW_P$. Then, step 4 proceeds.

Step 2) If N>0 and the BS determines to decrease the counter, N is set to N−1 (N=N−1).

Step 3) The channel is sensed for the additional sensing slot duration. If the additional sensing slot duration is idle, step 4 proceeds. Otherwise, step 5 proceeds.

Step 4) If N=0 (Y), the CAP is terminated. Otherwise, step 2 proceeds.

Step 5) The channel is sensed until either a busy sensing slot is detected within an additional defer duration $T_d$ or all sensing slots of the additional defer duration $T_d$ are detected to be idle.

Step 6) If the channel is sensed to be idle for all the slot durations of the additional defer duration $T_d$, step 4 proceeds. Otherwise, step 5 proceeds.

The UL Type 1 CAP may be applied to the following transmissions.

PUSCH/SRS transmission(s) scheduled and/or configured by the BS

PUCCH transmission(s) scheduled and/or configured by the BS

Transmission(s) related to a Random Access Procedure (RAP)

A Type 2 CAP is a CAP performed without random backoff. Type 2A, Type 2B, and Type 2C CAPs are defined for DL, and Type 2A, Type 2B, and Type 2C CAPs are defined for UL. In the Type 2A UL CAP, the UE may perform transmission immediately after the channel is sensed to be idle at least for a sensing duration Tshort_dl=25 us. Here, Tshort_dl consists of a duration Tf (=16 us) and one sensing slot duration immediately after the duration Tf. In the Type 2A UL CAP, Tf includes a sensing slot at the starting point of the duration. In the Type 2B UL CAP, the UE may perform transmission immediately after the channel is sensed to be idle for the sensing duration Tf=16 us. In the Type 2B UL CAP, Tf includes a sensing slot within 9 us from the end of the duration. In the Type 2C UL CAP, the UE may not perform channel sensing before performing transmission.

Configured Grant (CG)

The UE may be configured with a semi-static configured grant (CG) through RRC. For the BWP of a serving cell, the UE may be configured with up to 12 active CGs.

Each CG may have Type 1 or Type 2. Activation/deactivation of a Type-1 CG may be performed independently between serving cells. When a plurality of Type-2 CGs are configured, activation of each Type-2 CG may be separately performed by DCI. One DCI may inactivate one Type-2 CG or inactivate a plurality of Type-2 CGs.

For CG-based transmission on NR-U (i.e., shared spectrum channel access), configured grant uplink control information (CG-UCI) may be transmitted on a corresponding CG PUSCH (i.e., PUSCH scheduled by a CG). Multiplexing between CG-UCI and a PUCCH carrying a HARQ-ACK on NR-U may be configured/allowed by the BS. As a case where no multiplexing is configured between the CG-UCI and the PUCCH carrying the HARQ-ACK, the PUCCH carrying the HARQ-ACK may overlap with the CG PUSCH in a PUCCH group. In this case, transmission of the CG PUSCH may be dropped.

UCI on Configured Grant (CG)-PUSCH for URLLC

To support data transmission/services where reliability/latency performance is important such as URLLC, a service/protection priority (e.g., low priority (LP) or high priority (HP)) may be semi-statically configured to the UE for each physical layer channel/signal (transmission resource) (e.g., PUSCH) and control information (e.g., UCI) (through RRC signaling). Alternatively, the service/protection priority may be dynamically indicated to the UE (through DCI/MAC signaling).

Specifically, a priority indicator has been introduced to some DCI formats of NR Rel. 16 (e.g., DCI format 1_1/1_2 for DL and DCI format 0_1/0_2 for UL). When it is configured by higher layer signaling that the priority indicator is provided in the DCI format, the UE may perform blind decoding on the corresponding DCI format by assuming that the priority indicator is present. When it is not explicitly signaled by higher layer signaling that the priority indicator is used in the DCI format, the UE may perform blind decoding by assuming that no priority indicator field is included in the corresponding DCI format. If no priority information is provided for a DL/UL signal, the UE may assume that the DL/UL signal is LP (e.g., priority index=0). It may be understood by those skilled in the art that the priority indicator in DCI is one of various means for indicating/configuring the priority and the priority indicator is not the only method.

As an example of the above prioritization, a lower priority index may be configured/indicated for LP, and a higher priority index may be configured/indicated for HP. Alternatively, a lower bit value (e.g., bit '0') may be configured/indicated for LP, and a higher bit value (e.g., bit '1') may be configured/indicated for HP.

As an example, the priority (e.g., LP or HP) may be configured/indicated for each UCI type (e.g., HARQ-ACK, SR, and/or CSI) or for each PUCCH/PUSCH resource configured/indicated for UCI transmission. For example, in the case of a HARQ-ACK for a PDSCH, LP/HP may be indicated by DL grant DCI scheduling the PDSCH. For example, in the case of (aperiodic) CSI, LP/HP may be indicated by DCI (e.g., UL grant DCI scheduling a PUSCH). As another example, the priority (e.g. LP or HP) of a PUSCH may be configured/indicated by UL grant DCI scheduling the corresponding PUSCH.

As another example, (i) a PUCCH resource set may be independently configured for each priority, and/or (ii) a maximum UCI coding rate for PUCCH transmission may be independently configured for each priority. As another example, (iii) a beta offset ($\beta_{offset}$) for encoding UCI on a PUSCH (e.g., for HARQ-ACK, CSI part1/2, see Table 6) may be independently configured for each priority, and/or (iv) a HARQ-ACK codebook type may be independently configured for each priority. At least one of (i) to (iv) or any combination thereof may be used.

In NR Rel. 15/16, two parameters: a beta offset ($\beta_{offset}$) and an alpha factor ($\alpha$) are configured/used for UCI multiplexing (e.g. encoding/mapping) on a PUSCH (e.g., see Table 6). Here, $\beta_{offset}$ is a parameter for determining the coding rate of UCI, that is, the number of REs to which UCI (coded bits) is mapped, which may be configured/indicated separately for each UCI type. The alpha factor is a parameter that limits the maximum number of REs to which UCI is capable of being mapped, which may be set to a ratio of the maximum number of REs to which the UCI is capable of being mapped to the total number of REs available on the PUSCH.

Table 7 shows a structure/method of configuring $\beta_{offset}$ and the alpha factor of NR Rel. 15/16

TABLE 7

1) Semi-static $\beta_{offset}$
   A. A total of 7 $\beta_{offset}$ values may be configured by RRC (i.e., semi-static signaling).
      i. Three $\beta_{offset}$ values {B_a1, B_a2, B_a3} applied to three HARQ-ACK sizes {up to 2-bit, up to 11-bit, more than 11-bit}
      ii. Two $\beta_{offset}$ values {B_c11, B_c12} applied to two CSI part 1 sizes {up to 11-bit, more than 11-bit}
      iii. Two $\beta_{offset}$ values {B_c21, B_c22} applied to two CSI part 2 sizes {up to 11-bit, more than 11-bit}
   B. In {B_a1, B_a2, B_a3}, each $\beta_{offset}$ value may have a value more than or equal to 1.0 and less than or equal to 126, and in {B_c11, B_c12} and {B_c21, B_c22}, each $\beta_{offset}$ value may have a value more than or equal to 1.125 and less than or equal to 20.
2) Dynamic $\beta_{offset}$
   A. Assuming that one $\beta_{offset}$ set consists of the above 7 $\beta_{offset}$ values, one UE may be configured with a total of four $\beta_{offset}$ sets (i.e., a total of 7*4 $\beta_{offset}$ values) by RRC. According to the dynamic $\beta_{offset}$ method, one of the four $\beta_{offset}$ sets, which are preconfigured by RRC, may be dynamically indicated by DCI.
   B. $\beta_{offset}$ (set) indicated by DCI is applied to UCI multiplexing on a PUSCH scheduled by UL DCI format 0_1/0_2. Semi-static $\beta_{offset}$ to be applied when no dynamic $\beta_{offset}$ is indicated (e.g., for a fallback PUSCH scheduled by UL DCI format 0_0 or a CG PUSCH transmitted based on a CG) may be separately configured (in addition to the four $\beta_{offset}$ sets for dynamic $\beta_{offset}$, semi-static βoffset is further configured).
3) Alpha factor (semi-static (only))
   A. Only one value selected from {0.5, 0.65, 0.8, 1.0} is configured to the UE through RRC, and the configured alpha factor value is applied to UCI multiplexing on all PUSCHs.

For a NR-U CG PUSCH, which is introduced for UL transmission operation in a NR-U (unlicensed band or shared spectrum) environment in Rel-16, the UE may determine transmission parameter values (e.g., HARQ process number (HPN), NDI, RV, channel occupancy time (COT) sharing information, etc.) related to the PUSCH and piggyback the transmission parameter values over the PUSCH in the form of UCI. The parameter information piggybacked on the CG-PUSCH may be referred to as "CG-UCI".

For UCI multiplexing operation on the NR-U CG PUSCH carrying the CG-UCI, the BS may configure to the UE one of the following two modes: 1) Mode 1 and 2) Mode 2.

For convenience of description, "Joint(X+Y)" means that joint encoding is performed on X and Y, and "⌈X|Y⌋" means that separate encoding is performed between X and Y.

1) Mode 1
   A. When the CG PUSCH overlaps in time with a HARQ-ACK PUCCH, the UE may jointly encode CG-UCI and a HARQ-ACK and map/transmit the CG-UCI on the CG PUSCH.
   B. The combination of UCI capable of being multiplexed on the CG PUSCH according to Mode 1 may be ⌈Joint(CG-UCI+HARQ-ACK)|CSI part 1|CSI part 2⌋, ⌈Joint(CG-UCI+HARQ-ACK)⌋, or ⌈CG-UCI|CSI part 1|CSI part 2⌋.
2) Mode 2
   A. When the CG PUSCH overlaps in time with a HARQ-ACK PUCCH, the UE may not transmit the corresponding CG PUSCH (skip the transmission).
   B. When the combination of UCI capable of being multiplexed on the CG PUSCH is only ⌈CG-UCI|CSI part 1|CSI part 2⌋, Mode 2 may be used.
3) Note
   A. The value of $\beta_{offset}$ applied to CG-UCI encoding may be configured independently (separately from other UCI).
   B. When CG-UCI is jointly encoded with a HARQ-ACK, the value of $\beta_{offset}$ configured for the HARQ-ACK may be applied to the joint encoding (i.e., the value of $\beta_{offset}$ for the HARQ-ACK is applied to both the CG-UCI and HARQ-ACK which are jointly encoded).

Based on the above discussion, the present disclosure proposes a method of multiplexing/transmitting UCI on a CG PUSCH (including UCI encoding and $\beta_{offset}$ application therefor). The proposed method of multiplexing/transmission UCI on a CG PUSCH (including UCI encoding and $\beta_{offset}$ application therefor) may be performed in consideration of (i) a combination of the UCI and NR-U CG PUSCH, which are configured/indicated to have different priorities (e.g., LP and HP), and (ii) CG-UCI piggybacking on the NR-U CG PUSCH.

Hereinafter, a CG PUSCH may mean a NR-U CG PUSCH. For example, the NR-U CG PUSCH may be simply referred to as the CG PUSCH. The NR-U CG PUSCH may mean a PUSCH carrying CG-UCI for configured uplink grant operation on NR-U bands. For convenience of description, UCI configured/indicated with LP/HP is referred to as LP/HP UCI, and a PUSCH configured/indicated with LP/HP is referred to as an LP/HP PUSCH.

Figure 8:
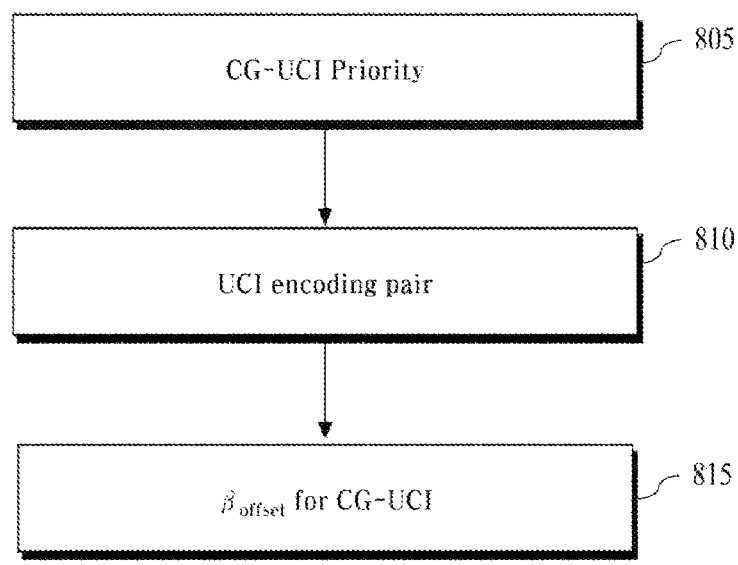
FIGS. 8 to 11 are diagrams for explaining an uplink signal transmission/reception method according to an embodiment of the present disclosure.

[1] Determination of UCI Encoding Pair after Determination of Priority of CG-UCI For example, referring to FIG. 8, the UE may determine the priority of CG-UCI (805) first and then determine a UCI (joint) encoding pair according to a combination of the UCI and priority (810). First, it is assumed that $\beta_{offset}$ for UCI encoding is configured for each PUSCH priority (e.g., LP or HP). For example, (1) for UCI multiplexing/transmission on an LP PUSCH, $\beta_{offset}$ value(s) may be configured for each of the two UCI+PUSCH priority combinations: (i) {LP UCI+LP PUSCH} and (ii) {HP UCI+LP PUSCH}, and (2) for UCI multiplexing/transmission on an HP PUSCH, $\beta_{offset}$ value(s) may be configured for each of the two UCI+PUSCH priority combinations: (iii) {HP UCI+HP PUSCH} and {LP UCI+HP PUSCH}. The above assumption is for convenience of description, and the present disclosure is not limited thereto.

1) Determination of Priority of CG-UCI (805)
   Alt 1: The priority of the CG-UCI may be determined to be the same as the priority configured for a CG PUSCH.
   Alt 2: The priority of the CG-UCI may be determined as HP (by regarding the CG-UCI as HP UCI).
   Alt 3: a) When UCI to be multiplexed on the CG PUSCH includes HARQ-ACKs, the priority of the CG-UCI may be handled/determined as the highest priority of the corresponding HARQ-ACKs, or b) When the UCI to be multiplexed on the CG PUSCH includes no HARQ-ACK, the priority of the CG-UCI may be determined as the same as the priority configured for the CG PUSCH.
2) Determination of UCI Encoding Pair (810)
   (Assumption) When the priority of the CG-UCI is determined as XP, and when only an YP HARQ-ACK is present or when both an XP HARQ-ACK and the YP HARQ-ACK are present (in the UCI to be multiplexed on the CG PUSCH) (where if XP=LP, YP=HP, and if XP=HP, YP=LP):

Opt 1: The UE may perform joint encoding on the CG-UCI and all HARQ-ACK(s) (with one or more priorities) (regardless of the priorities).

Opt 2: The UE may perform joint encoding only on the CG-UCI and a HARQ-ACK (with one priority) (e.g., single/specific HARQ-ACK) (regardless of the priorities).

i. As an example, if an XP HARQ-ACK having the same priority as an XP CG-UCI is first paired with the CG-UCI, encoding may be performed as follows: ⌈Joint(XP CG-UCI+ YP HARQ-ACK)⌋ (e.g., a case in which only an YP HARQ-ACK exists with no XP HARQ-ACK) or ⌈Joint(XP CG-UCI+XP HARQ-ACK)|YP HARQ-ACK⌋.

ii. As another example, when a HARQ-ACK with the highest priority is first paired, if YP>XP, encoding may be performed as follows: ⌈Joint(XP CG-UCI+YP HARQ-ACK)⌋ or ⌈Joint(XP CG-UCI+YP HARQ-ACK)|XP HARQ-ACK⌋.

Opt 3: The UE may be restricted to perform joint encoding only on the CG-UCI and HARQ-ACK(s) having the same priority.

i. For example, encoding may be performed as follows: ⌈XP CG-UCI|YP HARQ-ACK⌋ or ⌈Joint(XP CG-UCI+XP HARQ-ACK)|YP HARQ-ACK⌋.

ii. For example, the XP CG-UCI may be jointly encoded with the XP HARQ-ACK, but joint encoding of the XP CG-UCI and YP HARQ-ACK may not be allowed. The joint encoding of the XP CG-UCI and XP HARQ-ACK may be encoded separately with the YP HARQ-ACK, but joint encoding of the XP CG-UCI and YP HARQ-ACK may not be allowed.

iii. For example, first XP CG-UCI may be jointly encoded with second XP UCI (XP UCI including the XP HARQ-ACK), but joint encoding of the first XP CG-UCI and third UCI (e.g., UCI including the YP HARQ-ACK) may not be allowed. The joint encoding result of the first XP CG-UCI and second XP UCI may be separately encoded with the third UCI, but joint encoding of the first XP CG-UCI and third UCI may not be allowed.

Opts. 1 to 3 may be understood as examples of determining second UCI (a second UCI type or a second UCI priority) to be pared/joint encoded with first CG-UCI based on the priority of the first CG-UCI.

3) Determination of $\beta_{offset}$ to be Applied to CG-UCI (815)

The UE may apply the value of $\beta_{offset}$ configured for UCI having the highest priority among UCI jointly encoded with CG-UCI determined as described above (at the time of CG-UCI (joint) encoding).

Figure 9:
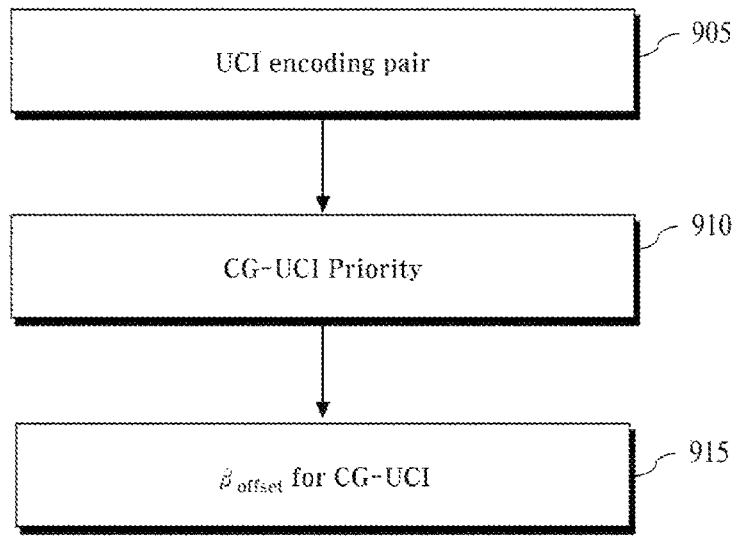

[2] Determination of Priority of CG-UCI after Determination of UCI Encoding Pair For example, referring to FIG. 9, the UE may first determine a UCI (joint) encoding pair (905) and then determine the priority of CG-UCI according to a combination of the UCI and priority (910). First, it is assumed that offset for UCI encoding is configured for each PUSCH priority (e.g., LP or HP). For example, (1) for UCI multiplexing/transmission on an LP PUSCH, $\beta_{offset}$ value(s) may be configured for each of the two UCI+PUSCH priority combinations: (i) {LP UCI+LP PUSCH} and (ii) (HP UCI+ LP PUSCH), and (2) for UCI multiplexing/transmission on an HP PUSCH, $\beta_{offset}$ value(s) may be configured for each of the two UCI+PUSCH priority combinations: (iii) {HP UCI+ HP PUSCH} and {LP UCI+HP PUSCH}. The above assumption is for convenience of description, and the present disclosure is not limited thereto.

1) Determination of UCI Encoding Pair (905)

Case 1: When there is only a single HARQ-ACK (with one priority) in UCI to be multiplexed on a CG PUSCH, the UE may perform joint encoding of the CG-UCI and the corresponding single HARQ-ACK.

Case 2: When there are a plurality of HARQ-ACKs (with different priorities) in the UCI to be multiplexed on the CG PUSCH, the UE may operate as follows.

i. Alt 1) The UE may perform joint encoding of both the CG-UCI and the plurality of HARQ-ACKs, or ii. Alt 2) The UE may perform joint encoding of the CG-UCI and a (single/specific) HARQ-ACK having the highest priority (e.g., HP) (among the plurality of HARQ-ACKs).

2) Determination of Priority of CG-UCI (910)

Case 1: When there are HARQ-ACK(s) in the UCI to be multiplexed on the CG PUSCH, the UE may determine the priority of the CG-UCI as the highest priority among the corresponding HARQ-ACK(s).

Case 2: When there are no HARQ-ACKs in the UCI to be multiplexed on the CG PUSCH, the UE may determine the priority of the CG-UCI as a priority configured for the CG PUSCH.

3) Determination of $\beta_{offset}$ to be Applied to CG-UCI (915)

The UE may apply the value of $\beta_{offset}$ configured for UCI having the highest priority among UCI jointly encoded with CG-UCI determined as described above (at the time of CG-UCI (joint) encoding).

[3] Operations Related to Simultaneous PUCCH/PUSCH Transmission

It may be considered to support simultaneous PUCCH/PUSCH transmission of the UE, which has been introduced in LTE, for NR. In this case, (dis)enabling of the simultaneous PUCCH/PUSCH transmission may be configured by the network/UE capability.

When the simultaneous PUSCH/PUSCH transmission is enabled, if a PUSCH and a HARQ-ACK PUCCH overlap in time, it may be defined that a HARQ-ACK is always be transmitted over a PUCCH without piggybacking on the PUSCH. If the simultaneous PUCCH/PUSCH transmission is associated with NR-U CG PUSCH transmission, the following additional operations may be required.

1) Additional Operation 1

A. If the simultaneous PUCCH/PUSCH transmission is enabled, the UE may operate by assuming Mode 2 for the NR-U CG PUSCH transmission carrying CG-UCI. Accordingly, in this situation (when the simultaneous PUCCH/PUSCH transmission is enabled), a) the UE may not expect to be configured with Mode 1 or b) the UE may ignore Mode 1 even if Mode 1 is configured. When the CG-PUSCH carrying the CG-UCI overlaps with the PUCCH carrying the HARQ-ACK in the time domain, the UE may skip transmission of the CG-PUSCH carrying the CG-UCI (by assuming that Mode 2 is configured or based on the configuration of Mode 2). When the simultaneous PUCCH/PUSCH transmission is enabled, if the CG-PUSCH carrying the CG-UCI overlaps with the PUCCH carrying the HARQ-ACK in the time domain, the UE may skip transmission of CG-PUSCH carrying CG-UCI (by assuming that Mode 2 is configured even if Mode 1 is actually configured).

B. For example, additional operation 1 may be defined/configured to be applied only to a NR-U CG PUSCH and a HARQ-ACK PUCCH located on different bands (or cells) and configured/indicated to have different priorities. For example, when the simultaneous PUCCH/PUSCH transmission is enabled, if a NR-U CG PUSCH and a HARQ-ACK PUCCH are located in the same band, the UE may not apply additional operation 1 (e.g., simultaneous transmission of the NR-U CG PUSCH and HARQ-ACK PUCCH). For example, when the simultaneous PUCCH/PUSCH transmission is enabled, if a NR-U CG PUSCH and a HARQ-ACK PUCCH have the same priority, the UE may not apply additional operation 1 (e.g., simultaneous transmission of the NR-U CG PUSCH and HARQ-ACK PUCCH).

2) Additional Operation 2

A. When the simultaneous PUCCH/PUSCH transmission is enabled (and when the UE operates in Mode 2 for a NR-U CG PUSCH), even if the NR-U CG PUSCH carrying CG-UCI overlaps with a HARQ-ACK PUCCH in time, the UE may operate so as not to skip/drop (unconditionally) the corresponding CG PUSCH transmission (e.g., if the UE has UL data, the UE may transmit the data on the corresponding CG PUSCH). When the CG-PUSCH carrying the CG-UCI overlaps with the PUCCH carrying the HARQ-ACK in the time domain, the UE may not skip transmission of the CG-PUSCH carrying the CG-UCI even if Mode 2 is configured. When the UE does not skip the CG-PUSCH transmission, the UE may simultaneously transmit the CG-PUSCH carrying the CG-UCI and the PUCCH carrying the HARQ-ACK based on that the simultaneous PUCCH/PUSCH transmission is enabled.

B. Additional operation 2 may be defined/configured to be applied only to a NR-U CG PUSCH and a HARQ-ACK PUCCH located on different bands (or cells) and configured/indicated to have different priorities. For example, when the simultaneous PUCCH/PUSCH transmission is enabled, if a NR-U CG PUSCH and a HARQ-ACK PUCCH are located in the same band, the UE may not apply additional operation 2 (e.g., the UE may skip transmission of the CG-PUSCH according to Mode 2 even though the simultaneous PUCCH/PUSCH transmission is enabled). For example, when the simultaneous PUCCH/PUSCH transmission is enabled, if a NR-U CG PUSCH and a HARQ-ACK PUCCH have the same priority, the UE may not apply additional operation 2 (e.g., the UE may skip transmission of the CG-PUSCH according to Mode 2 even though the simultaneous PUCCH/PUSCH transmission is enabled).

3) Additional Operation 3

A. When simultaneous transmission of a PUCCH (e.g. HARQ-ACK PUCCH) and a PUSCH (e.g. CG PUSCH), which are located on different bands (or cells) and configured/indicated to have different priorities, is enabled, Mode 1 and Mode 2 operations may be applied only to a HARQ-ACK PUCCH and a CG PUSCH that are located on the same band (or cell) or configured/indicated to have the same priority as described above. When a HARQ-ACK PUCCH and a CG PUSCH are located on different bands (or cells) and configured/indicated to have different priorities, the UE may simultaneously transmit the corresponding PUCCH and PUSCH (without performing HARQ-ACK multiplexing/mapping on the PUSCH as in Mode 1 or skipping PUSCH (or PUCCH) transmission as in Mode 2).

B. When the above-described Mode 1 operation is applied between a HARQ-ACK PUCCH and a CG PUSCH configured/indicated to have different priorities, separate encoding may be performed between the corresponding HARQ-ACK and CG-UCI (corresponding encoded bits are multiplexed/mapped on the corresponding CG PUSCH). When the above-described Mode 2 operation is applied between a HARQ-ACK PUCCH and a CG PUSCH configured/indicated to have different priorities, the UE may transmit only a UL channel configured/indicated with a higher priority among the corresponding PUCCH and PUSCH (by dropping/skipping transmission of a UL channel configured/indicated with a lower priority).

When the number of REs allocated to LP UCI is not sufficient (due to excess of a prescribed maximum coding rate) after joint encoding and/or separate encoding is performed on LP CG-UCI (and/or LP HARQ-ACK) and a HP HARQ-ACK, the following handling operations may be required. For example, (i) when the maximum number of REs available for UCI on an LP CG PUSCH is N, (ii) when the number of REs required to map the result of the joint encoding and/or separate encoding on the LP CG-UCI (and/or LP HARQ-ACK) and HP HARQ-ACK is M, and (iii) when N<M, all or at least some of the following handling operations may be performed.

1) Handling Operation 1

A. The UE may reduce the payload size for the LP HARQ-ACK among the LP CG-UCI and LP HARQ-ACK (by applying bundling and/or dropping). For example, to handle a shortage in the number of REs available for UCI, the UE may apply bundling and/or dropping first to the LP HARQ-ACK, and if necessary, the UE may continue applying the bundling and/or dropping to the LP CG-UCI. That is, it may be understood that the HP HARQ-ACK has the highest importance.

2) Handling Operation 2

A. When the UE performs bundling and/or dropping on the LP CG-UCI to handle a shortage in the number of REs, (i) the UE may reduce the 2-bit RV included in the LP CG-UCI to 1 or 0 bits (in the latter case, a default RV value (e.g. RV=0) is applied to the CG PUSCH), and/or (ii) the UE may reduce the COT-info field included in the LP CG-UCI to L (L>0) or 0 bits (in the latter case, the UE may assume/apply a specific default value (among configured combinations) for COT sharing).

3) Even when the number of HP UCI REs becomes insufficient after joint encoding of HP CG-UCI and the HP HARQ-ACK, an operation similar to the handling operation ½ may be applied. For example, (i) when the maximum number of REs available for UCI on an HP CG PUSCH is N, (ii) when the number of REs required to map the result of joint encoding on the HP CG-UCI and HP HARQ-ACK is M, (iii) when N<M or when M is greater than a specified value less than N(=Nm<N), all or at least some of the following handling operations may be performed. The UE may reduce the payload size for the HP HARQ-ACK among the HP CG-UCI and HP HARQ-ACK (by applying bundling and/or dropping). For example, to handle a shortage in the number of REs available for UCI, the UE may apply bundling and/or dropping first to the HP HARQ-ACK. If necessary, the UE may continue applying the bundling and/or dropping to the HP CG-UCI. That is, it may be understood that the HP CG-UCI has the highest importance. Specifically, (i) the UE may reduce the 2-bit RV included in the HP CG-UCI to 1 or 0 bits (in the latter case, a default RV value (e.g. RV=0) is applied to the CG PUSCH), and/or (ii) the UE may reduce the COT-info field included in the LP CG-UCI to L (L>0) or 0 bits (in the latter case, the UE may assume/apply a specific default value (among configured combinations) for COT sharing).

As another method, when N<M or when Nm<M as described above, the UE may drop/skip transmission of the HP CG PUSCH and transmit only a PUCCH carrying the HP HARQ-ACK (or transmit the HP HARQ-ACK by multiplexing/mapping the HP HARQ-ACK to another PUSCH). Alternatively, the UE may perform RE mapping for UCI (and a UL-SCH) such as the HP CG-UCI and HP HARQ-ACK by ignoring a predetermined alpha factor value and assuming/applying an alpha factor value of 1.0 (that is, by regarding that all REs in the HP CG PUSCH (except for an RS) are available for UCI mapping).

[4] Selection of PUSCH on which UCI Multiplexing is Performed

When a NR-U CG PUSCH based on Mode 2 (hereinafter, Mode 2 CG PUSCH) and other PUSCH(s) (hereinafter, non-Mode 2 PUSCH) (for example, a CG PUSCH not based on Mode 2 and/or a dynamic grant (DG) PUSCH scheduled based on a DG) all overlap with a HARQ-ACK PUCCH in time, the UE may operate as follows.

Alt 1) If the Mode 2 CG PUSCH and HARQ-ACK PUCCH overlap only in time, the UE may (unconditionally) skip transmission of the Mode 2 CG PUSCH without transmitting the corresponding Mode 2 CG PUSCH.

Alt 2) When the UE selects a PUSCH on which UCI multiplexing is to be performed according to a specific rule, if the selected PUSCH is the Mode 2 CG PUSCH, the UE may skip transmission of the Mode 2 CG PUSCH without transmitting the corresponding Mode 2 CG PUSCH (otherwise, if the PUSCH selected for UCI multiplexing is the non-Mode 2 PUSCH, the UE may not (unconditionally) skip the Mode 2 CG PUSCH transmission).

Figure 10:
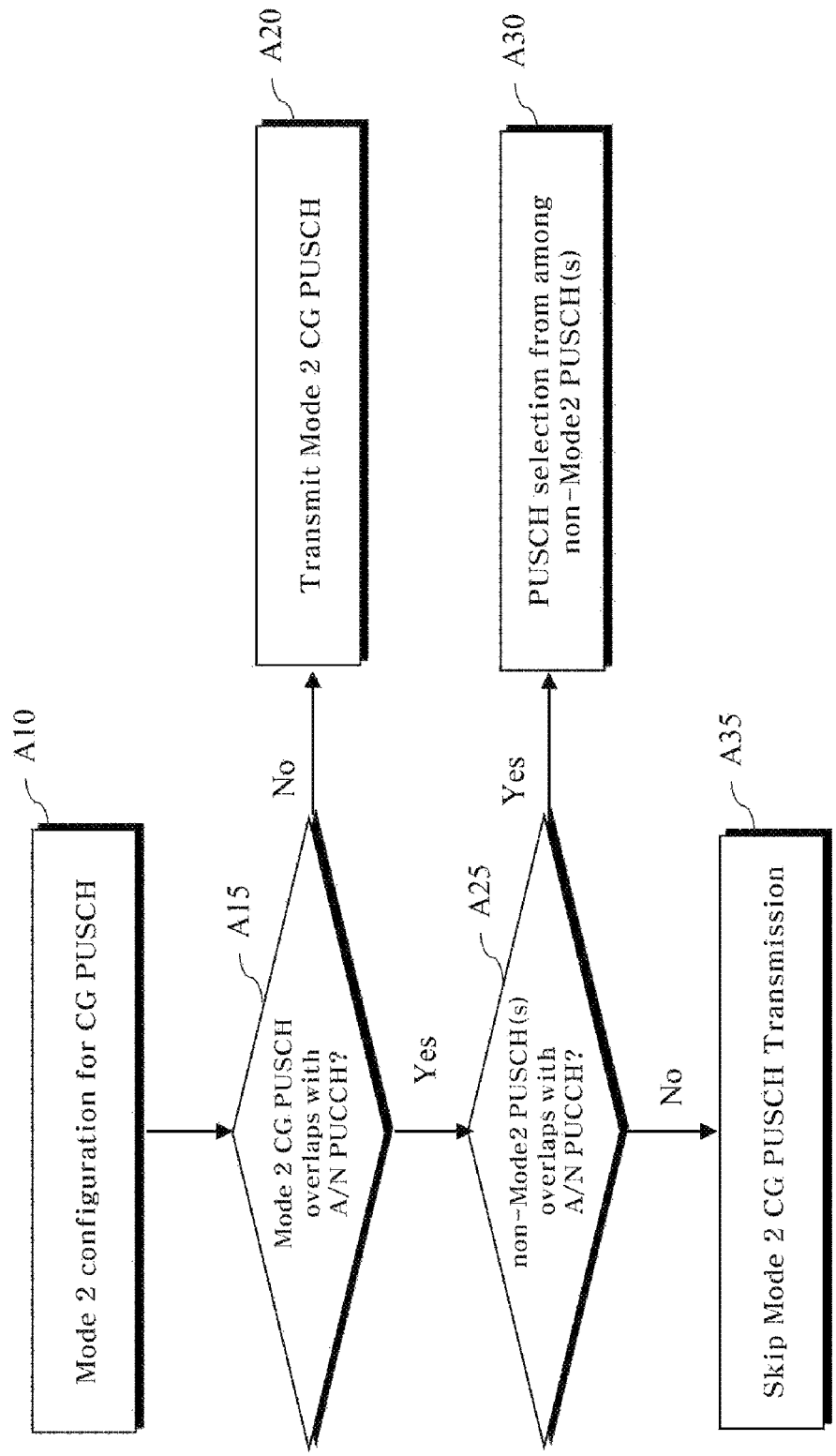

Alt 3) To prevent/minimize unnecessary skipping of Mode 2 CG PUSCH transmission, which is caused by application of Alt 1/2 (because UCI multiplexing is expected to be performed on a non-Mode 2 PUSCH rather than the Mode 2 CG PUSCH), when both the Mode 2 CG PUSCH and non-Mode 2 PUSCH(s) overlap in time with a HARQ-ACK PUCCH, the UE may select a PUSCH on which UCI multiplexing is to be performed from among the remaining non-Mode 2 PUSCH(s) except for the Mode 2 CG PUSCH (for example, the UE may select the PUSCH by applying a specific rule only to the remaining non-Mode 2 PUSCH(s) except for the Mode 2 CG PUSCH). On the contrary, when only the Mode 2 CG PUSCH (other than the non-Mode 2 PUSCH) overlaps in time with the HARQ-ACK PUCCH, the UE may be configured to skip the Mode 2 CG PUSCH transmission instead of transmitting the corresponding Mode 2 CG PUSCH. For example, referring to FIG. 10, Mode 2 may be configured for a CG PUSCH (A10). If a Mode 2 CG PUSCH does not overlap with a HARQ-ACK PUCCH (if there is no cause of dropping/skipping such as overlapping with another high-priority signal), the UE may transmit the Mode 2 CG PUSCH (A20). When the Mode 2 CG PUSCH overlaps with the HARQ-ACK PUCCH, and more specifically, when the corresponding HARQ-ACK PUCCH overlaps with one or more non-Mode 2 PUSCHs (Yes in A25), the UE may select a PUSCH from among the one or more non-Mode 2 PUSCHs (A30) and transmit the PUSCH after multiplexing UCI (e.g., HARQ-ACK) on the PUSCH. For example, when a HARQ-ACK is multiplexed on the selected non-Mode 2 PUSCH (because it is expected that a PUCCH for the HARQ-ACK will not be transmitted), the UE may not skip the Mode 2 CG PUSCH. If the corresponding HARQ-ACK PUCCH does not overlap with (any) non-Mode 2 PUSCHs (No in A25), the UE may skip the Mode 2 CG PUSCH (A35) and transmit a HARQ-ACK over the PUCCH.

[5] Multiplexing of CG PUSCH and HARQ-ACK with Different Priorities

To multiplex and transmit an XP CG PUSCH (and CG-UCI related thereto) and an YP HARQ-ACK (on the CG-PUSCH), which have different priorities, the following RE allocation methods and/or RE mapping methods may be considered.

1) Conventional Method

Table 8 shows a method of multiplexing UCI on a PUSCH in NR Rel-15/16 (for convenience, the method is referred to as "Rel-15/16 UCI on PUSCH").

TABLE 8

1. There may be three UCI types: UCI type 1 (e.g., HARQ-ACK), UCI type 2 (e.g., CSI part 1), and UCI type 3 (e.g., CSI part 2), and protection priorities may be given in the following order: UCI type 1 > UCI type 2 > UCI type 3.
2. First, the number of allocated REs for each UCI type will be described. It is assumed that the total number of REs available for UCI mapping on a PUSCH resource is N.
    ⓐ For UCI type 1, the number of REs to which UCI type 1 is to be mapped, N1 may be calculated based on a UCI payload size and a beta offset '$\beta_{offset}$' value (configured/indicated for UCI type 1).
    ⓑ For UCI type 2, the number of REs to which UCI type 2 is to be mapped, N2 may be calculated based on a UCI payload size and a beta offset '$\beta_{offset}$' value (configured/indicated for UCI type 2) (in a state where (N − N1) REs are remaining).
    ⓒ For UCI type 3, the number of REs to which UCI type 3 is to be mapped, N3 may be calculated based on a UCI payload size and a beta offset '$\beta_{offset}$' value (configured/indicated for UCI type 3) (in a state where (N − N1 − N2) REs are remaining).
3. Next, the RE mapping method for each UCI type may vary depending on the payload size of UCI type 1.
    ⓐ When the payload size of UCI type 1 is less than or equal to 2 bits, the following RE mapping method may be applied.
        (i) The UE may first reserves RE(s) on the earliest non-DMRS symbol after a first DMRS symbol on the PUSCH resource as a reserved RE set related to 2-bit UCI type 1 (sequentially).
        (ii) Next, UCI type 2 and UCI type 3 (and/or a UL-SCH) may be mapped (sequentially) from RE(s) on the first non-DMRS symbol on the PUSCH (UCI type 2 may be mapped first, UCI type 3 may be mapped, and then the UL-SCH may be mapped). In this case, UCI type 2 may not be mapped to reserved RE(s) for UCI type 1 (which are reserved in advance) (that is, UCI type 2 may be mapped to REs except for the corresponding reserved RE(s)), whereas UCI type 3 (and/or the UL-SCH) may be mapped to the corresponding reserved RE(s) for UCI type 1.
        (iii) Thereafter, if there is no UCI type 1 (i.e., if UCI type 1 is 0 bits), additional UCI RE mapping may not be performed. On the other hand, if UCI type 1 is present (i.e., if UCI type 1 is 1 or 2 bits), UCI type 1 may be mapped to (all or some of) the reserved RE(s) for UCI type 1 (by puncturing UCI type 3 (and/or the UL-SCH) which is previously mapped).
    ⓑ When the payload size of UCI Type 1 is more than 2 bits, the following RE mapping method may be applied.
        (i) The UE may first map UCI type 1 (sequentially) to RE(s) on the earliest non-DMRS symbol after the first DMRS symbol on the PUSCH resource.
        (ii) Next, UCI type 2 and UCI type 3 (and/or a UL-SCH) may be mapped (sequentially) from RE(s) on the first non-DMRS symbol on the PUSCH (UCI type 2 may be mapped first, UCI type 3 may be mapped, and then the UL-SCH may be mapped). In this case, both UCI type 2 and UCI type 3 (and/or the UL-SCH) may not be mapped to the RE(s) to which UCI type 1 is already mapped (i.e., all of UCI type 2 and UCI type 3 (and/or the UL-SCH) may be mapped to the remaining REs except for the RE(s) to which UCI type 1 is mapped).

2) Proposed Method

A. Case H-1: When a UCI combination requiring multiplexing transmission on a HP CG PUSCH is {CG-UCI, LP HARQ-ACK} (or when {CG-UCI, LP HARQ-ACK} is included in the UCI combination), the UE may operate as follows.

i. The UE may apply the RE allocation and RE mapping method related to UCI type 1 and UCI type 2 in "Rel-15/16 UCI on PUSCH" to the CG-UCI and the LP HARQ-ACK, respectively. For example, based on UCI multiplexing related to HP CG-UCI and the LP HARQ-ACK, the UE may calculate the number of REs to which the HP CG-UCI is to be mapped, $N_1$ among a total of N REs available for UCI on an HP CG PUSCH resource. For example, the number of REs to which the HP CG-UCI is to be mapped, $N_1$ may be calculated based on a first $\beta_{offset}$ value (e.g., $\beta_{offset}^{CG\text{-}UCI}$) for the HP CG-UCI and the corresponding UCI payload. The UE may calculate the number of REs to which the LP HARQ-ACK is to be mapped, $N_2$ (in a state where (N–$N_1$) REs remain). For example, the number of REs to which the LP HARQ-ACK is to be mapped, $N_2$ may be calculated based on a second $\beta_{offset}$ value (e.g., $\beta_{offset}^{HARQ\text{-}ACK}$) for the LP HARQ-ACK and the corresponding UCI payload. If the payload of the HP CG-UCI is less than or equal to 2 bits, the UE may map the LP HARQ-ACK in a state where a reserved RE set is reserved (and if necessary, the UE may map other low-priority UCI and/or UL-SCHs), and then the UE may map the HP CG-UCI by puncturing on reserved REs. If the HP CG-UCI is more than 2 bits, the HP CG-UCI may be mapped, and then the LP HARQ-ACK may be mapped (based on PUSCH rate matching).

1. Alternatively, in CASE H-1, the UE may apply the RE allocation and RE mapping method related to UCI type 1 in "Rel-15/16 UCI on PUSCH" by jointly encoding the CG-UCI and the LP HARQ-ACK.

B. Case H-2: When a UCI combination requiring multiplexing transmission on a HP CG PUSCH is {CG-UCI, HP HARQ-ACK, LP HARQ-ACK} (or when {CG-UCI, HP HARQ-ACK, LP HARQ-ACK} is included in the UCI combination), the UE may operate as follows.

i. The UE may apply the RE allocation and RE mapping method related to UCI type 1 in "Rel-15/16 UCI on PUSCH" by jointly encoding the CG-UCI and the HP HARQ-ACK, and the UE may apply the RE allocation and RE mapping method related to UCI type 2 in "Rel-15/16 UCI on PUSCH" to the LP HARQ-ACK.

C. Case L-1: When a UCI combination requiring multiplexing transmission on an LP CG PUSCH is {CG-UCI, HP HARQ-ACK} (or when {CG-UCI, HP HARQ-ACK} is included in the UCI combination), the UE may operate as follows.

i. The UE may apply the RE allocation and RE mapping method related to UCI type 1 and UCI type 2 in "Rel-15/16 UCI on PUSCH" to the HP HARQ-ACK and the CG-UCI, respectively. For example, based on UCI multiplexing related to LP CG-UCI and the HP HARQ-ACK, the UE may calculate the number of REs to which the HP HARQ-ACK is to be mapped, $N_1$ among a total of N REs available for UCI on an LP CG PUSCH resource. For example, the number of REs to which the HP HARQ-ACK is to be mapped $N_1$ may be calculated based on a third $\beta_{offset}$ value (e.g., $\beta_{offset}^{HARQ\text{-}ACK}$) the HARQ-ACK and the offset corresponding UCI payload. The UE may calculate the number of REs to which the LP CG-UCI is to be mapped, $N_2$ (in a state where (N–N1) REs remain). For example, the number of REs to which the LP CG-UCI is to be mapped, $N_2$ may be calculated based on a fourth $\beta_{offset}$ value (e.g., $\beta_{offset}^{CG\text{-}UCI}$) for the LP CG-UCI and the corresponding UCI payload. If the payload of the HP HARQ-ACK is less than or equal to 2 bits, the UE may map the LP CG-UCI in a state where a reserved RE set is reserved (and if necessary, the UE may map other low-priority UCI and/or UL-SCHs), and then the UE may map the HP HARQ-ACK by puncturing on reserved REs. If the HP HARQ-ACK is more than 2 hits, the HP HARQ-ACK may be mapped, and then the LP CG-UCI may be mapped (based on PUSCH rate matching). If the number of REs required for CG-UCI mapping (=$N_2$) is more than the number of REs remaining after HP HARQ-ACK mapping (=N–$N_1$) or a specific number of REs (=Nm<N–$N_1$), the UE may drop/skip transmission of the LP CG PUSCH and transmit only a PUCCH carrying the HP HARQ-ACK (or transmit the HP HARQ-ACK by multiplexing/mapping the HP HARQ-ACK on another PUSCH). Alternatively, the UE may perform RE mapping for the HP HARQ-ACK and CG-UCI (and UL-SCH) by ignoring a predetermined alpha factor value and assuming/applying an alpha factor value of 1.0 (that is, by regarding that all REs in the LP CG PUSCH (except for an RS) are available for UCI mapping)

1. Alternatively, in CASE L-1, the UE may apply the RE allocation and RE mapping method related to UCI type 1 in "Rel-15/16 UCI on PUSCH" by jointly encoding the HP HARQ-ACK and CG-UCI.

D. Case L-2: When a UCI combination requiring multiplexing transmission on an LP CG PUSCH is {CG-UCI, HP HARQ-ACK, LP HARQ-ACK} (or when {CG-UCI, HP HARQ-ACK, LP HARQ-ACK} is included in the UCI combination), the UE may operate as follows.

i. The UE may apply the RE allocation and RE mapping method related to UCI type 1 in "Rel-15/16 UCI on PUSCH" to the HP HARQ-ACK, and the UE may apply the RE allocation and RE mapping method related to UCI type 2 in "Rel-15/16 UCI on PUSCH" by jointly encoding the CG-UCI and LP HARQ-ACK. If the number of REs required for CG-UCI and LP HARQ-ACK mapping (=$N_2$) is more than the number of REs remaining after HP HARQ-ACK mapping (=N–$N_1$) or a specific number of REs (=Nm<N–$N_1$), the UE may drop/skip transmission of the LP CG PUSCH and transmit only a PUCCH carrying the HP HARQ-ACK and/or LP HARQ-ACK (or transmits the HP HARQ-ACK and/or LP HARQ-ACK by multiplexing/mapping the corresponding HP HARQ-ACK and/or LP HARQ-ACK on another PUSCH). Alternatively, the UE may perform RE mapping for the HP HARQ-ACK, LP HARQ-ACK, and CG-UCI (and UL-SCH) by ignoring a predetermined alpha factor value and assuming/applying an alpha factor value of 1.0 (that is, by regarding that all REs in the LP CG PUSCH (except for an RS) are available for UCI mapping).

1. Alternatively, in Case L-2, the UE may apply the RE allocation and RE mapping method related to UCI type 1 in "Rel-15/16 UCI on PUSCH" by jointly encoding the HP HARQ-ACK and CG-UCI, and the UE may apply the RE allocation and RE mapping method related to UCI type 2 in "Rel-15/16 UCI on PUSCH" to the LP HARQ-ACK.

Table 9 summarizes at least some of the examples of "2) Proposal Method" above.

TABLE 9

| | | HP UCI | | LP UCI | | |
|---|---|---|---|---|---|---|
| CASE | CG PUSCH | Contents | UCI type (Priority) | Contents | UCI type (Priority) | UCI Encoding |
| H-1_i | HP | CG-UCI | 1 | HARQ-ACK | 2 | [CG-UCI \| HARQ-ACK] |

TABLE 9-continued

| CASE | CG PUSCH | HP UCI Contents | UCI type (Priority) | LP UCI Contents | UCI type (Priority) | UCI Encoding |
|---|---|---|---|---|---|---|
| H-1_i_1 | HP | CG-UCI | 1 (joint) | HARQ-ACK | 1 (joint) | Joint (CG-UCI + HARQ-ACK) |
| H-2_i | HP | CG-UCI HARQ-ACK1 | 1 (joint) | HARQ-ACK2 | 2 | [Joint (CG-UCI + HARQ-ACK1) \| HARQ-ACK2] |
| L-1_i | LP | HARQ-ACK | 1 | CG-UCI | 2 | [HARQ-ACK \| CG-UCI] |
| L-1_i_1 | LP | HARQ-ACK | 1 (joint) | CG-UCI | 1 (joint) | Joint (HARQ-ACK + CG-UCI) |
| L-2_i | LP | HARQ-ACK1 | 1 | CG-UCI HARQ-ACK2 | 2 (joint) | [HARQ-ACK1 \| Joint (CG-UCI + HARQ-ACK2)] |
| L-2_i_1 | LP | HARQ-ACK1 | 1 (joint) | CG-UCI HARQ-ACK2 | 1 (joint) 2 | [Joint (HARQ-ACK1 + CG-UCI) \| HARQ-ACK2] |

Figure 11:
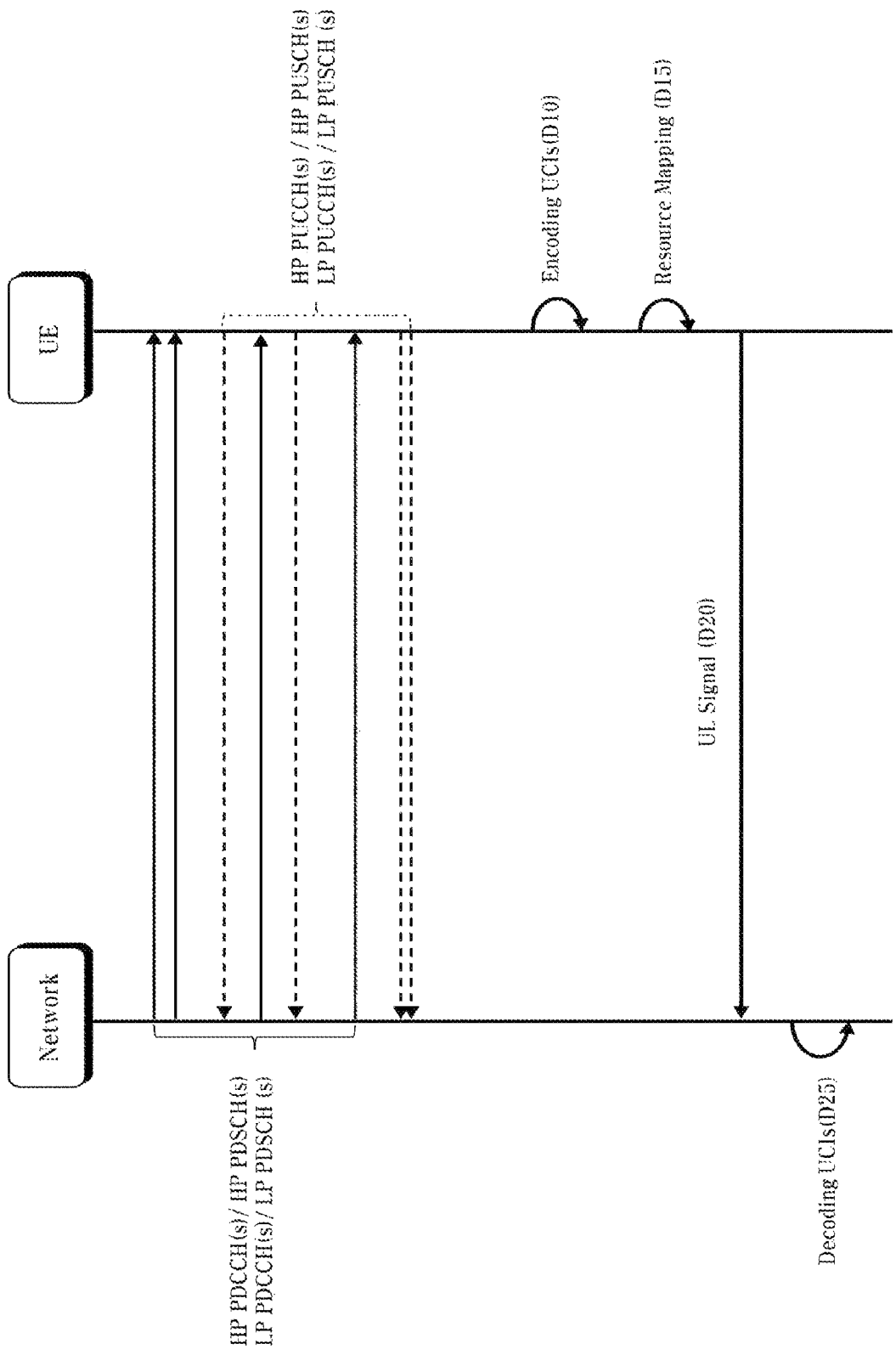

FIG. 11 illustrates an implementation example of a signal transmission/reception method according to an embodiment of the present disclosure. FIG. 11 is for better understanding of the above-described examples, and the scope of the present disclosure is not limited to FIG. 11. The redundant description may be omitted, and the above-described content may be referred to if necessary.

Referring to FIG. 11, a network (e.g., one or more BSs) and a UE may transmit and receive HP UL/DL signals and LP UL/DL signals.

When HP/LP multiplexing is not configured, if the transmission timing of an HP UL signal and the transmission timing of an LP UL signal overlap with each other, the LP UL signal may be dropped. On the other hand, when HP/LP multiplexing is configured, if the transmission timing of an HP UL signal and the transmission timing of an LP UL signal overlap with each other, the UE may operate as follows.

The UE may encode a plurality of UCIs including a first type of UCI and a second type of UCI (D10).

The UE may perform resource mapping of encoded bits of the plurality of UCIs on a single physical UL channel (D15).

The UE may perform UL transmission based on the resource mapping (D20). The BS may receive the encoded bits of the plurality of UCIs multiplexed on the single physical UL channel from the UE.

The BS may obtain the first type of UCI and the second type of UCI by decoding the encoded bits of the plurality of UCIs (D25).

The UE may be configured to multiplex the plurality of UCIs on the single physical UL channel even though the first type of UCI and the second type of UCI have different priorities. The corresponding configuration may be performed based on signaling from the BS.

Based on the first type of UCI including a CG-UCI for a CG operation in a shared spectrum, the second UCI including a HARQ-ACK, and the CG-UCI and the HARQ-ACK having different priorities, the UE may (i) perform the encoding for each of the CG-UCI and the HARQ-ACK and (ii) perform the resource mapping for each of the CG-UCI and the HARQ-ACK.

Based on the first type of UCI including CG-UCI for CG operation in a shared spectrum, the second UCI including a HARQ-ACK, and the CG-UCI and the HARQ-ACK having different priorities, the BS may determine resource mapping for each of the CG-UCI and the HARQ-ACK and perform the decoding for each of the CG-UCI and the HARQ-ACK based on the determined resource mapping.

When the single physical UL channel is allocated a second priority higher than a first priority, the UE may first determine the number of resources to be allocated to the CG-UCI and then determine the number of resources to be allocated to the HARQ-ACK among the remaining resources. For example, based on the CG-UCI being less than or equal to 2 bits, the UE may perform resource mapping for the HARQ-ACK on the remaining resources except for reserved resources and perform resource mapping for the CG-UCI by puncturing on the reserved resources. For example, based on the CG-UCI being more than 2 bits, the UE may perform resource mapping for the HARQ-ACK after performing resource mapping for the CG-UCI.

When the single physical UL channel is allocated a first priority lower than a second priority, the UE may first determine the number of resources to be allocated to the HARQ-ACK and then determine the number of resources to be allocated to the CG-UCI among the remaining resources. For example, based on the HARQ-ACK being less than or equal to 2 bits, the UE may perform resource mapping for the CG-UCI on the remaining resources except for reserved resources and perform resource mapping for the HARQ-ACK by puncturing on the reserved resources. For example, based on the HARQ-ACK being more than 2 bits, the UE may perform resource mapping for the CG-UCI after performing resource mapping for the HARQ-ACK.

The single physical UL channel may be a CG-PUSCH, and the priority of the CG-PUSCH may be different from the priority of the HARQ-ACK.

Joint encoding of the CG-UCI and the HARQ-ACK, which have the different priorities and are multiplexed on the single physical UL channel, may not be allowed. For example, the CG-UCI may be jointly encoded with a specific HARQ-ACK having the same priority as the CG-UCI, and the result of the joint encoding and the HARQ-ACK included in the second type of UCI may be separately encoded.

Figure 12:
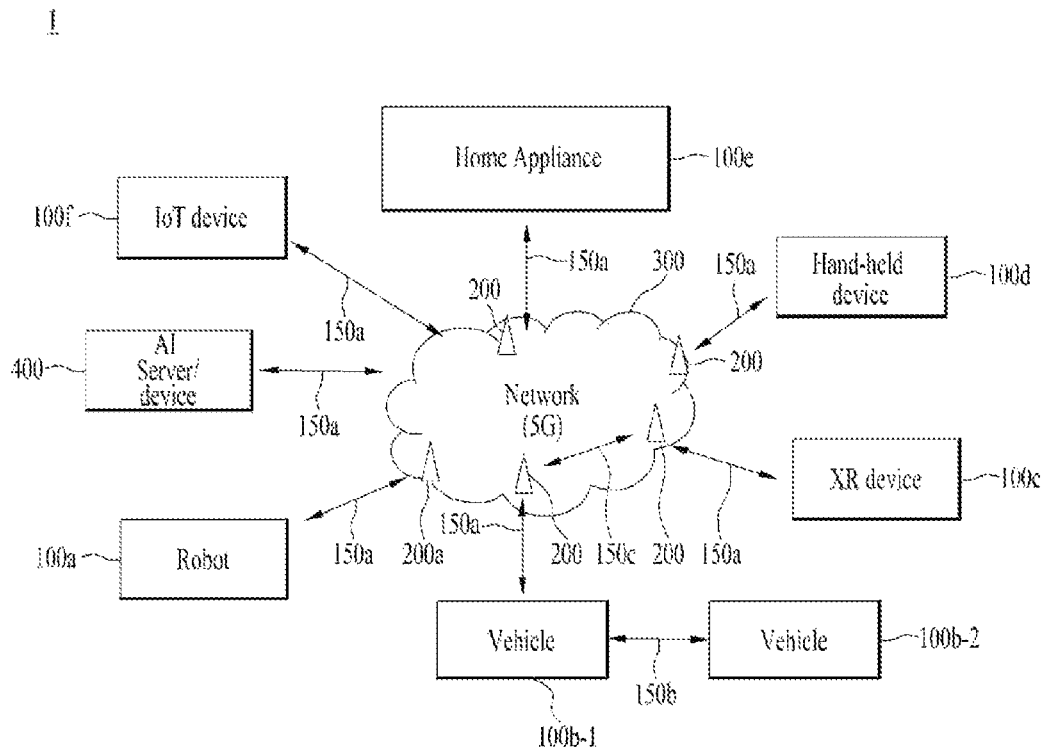
FIGS. 12 to 15 illustrate a communication system 1 and wireless devices applied to the present disclosure.

FIG. 12 illustrates a communication system 1 applied to the present disclosure.

Referring to FIG. 12, a communication system 1 applied to the present disclosure includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 13:
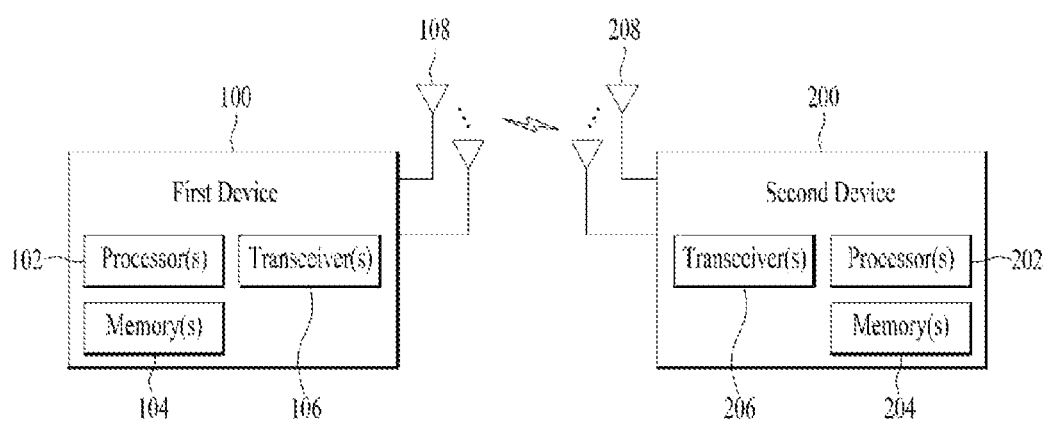

FIG. 13 illustrates wireless devices applicable to the present disclosure.

Referring to FIG. 13, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 12.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF hand signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 14:
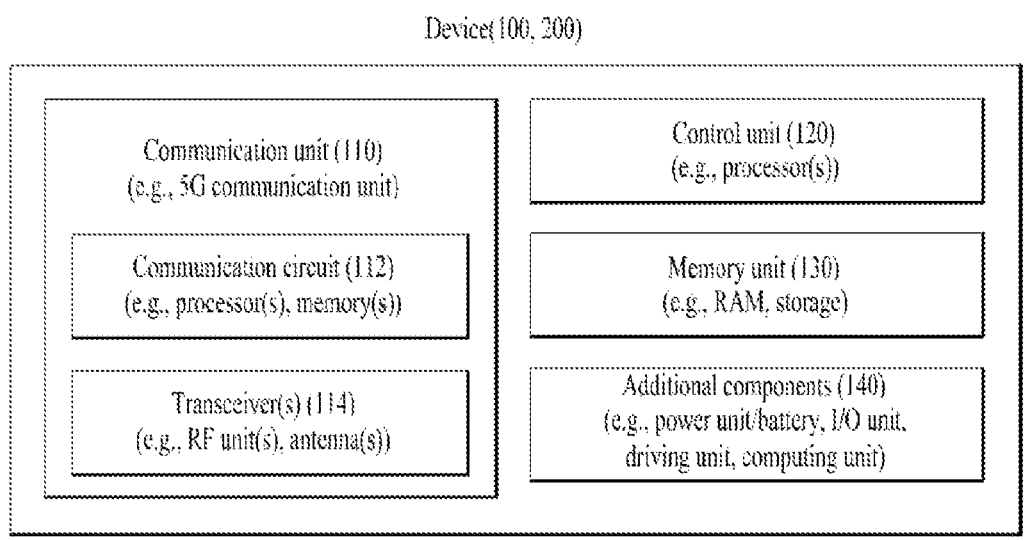

FIG. 14 illustrates another example of a wireless device applied to the present disclosure. The wireless device may be implemented in various forms according to a use-case/service (refer to FIG. 12).

Referring to FIG. 14, wireless devices 100 and 200 may correspond to the wireless devices 100 and 200 of FIG. 13 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 13. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 12), the vehicles (100*b*-1 and 100*b*-2 of FIG. 12), the XR device (100*c* of FIG. 12), the hand-held device (100*d* of FIG. 12), the home appliance (100*e* of FIG. 12), the IoT device (100*f* of FIG. 12), a digital broadcast terminal, a hologram device, a public safety device, an MTC device, a medicine device, a fintech device (or a finance device), a security device, a climate/environment device, the AI server/device (400 of FIG. 12), the BSs (200 of FIG. 12), a network node, etc. The wireless device may be used in a mobile or fixed place according to a use-example/service.

In FIG. 14, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 15:
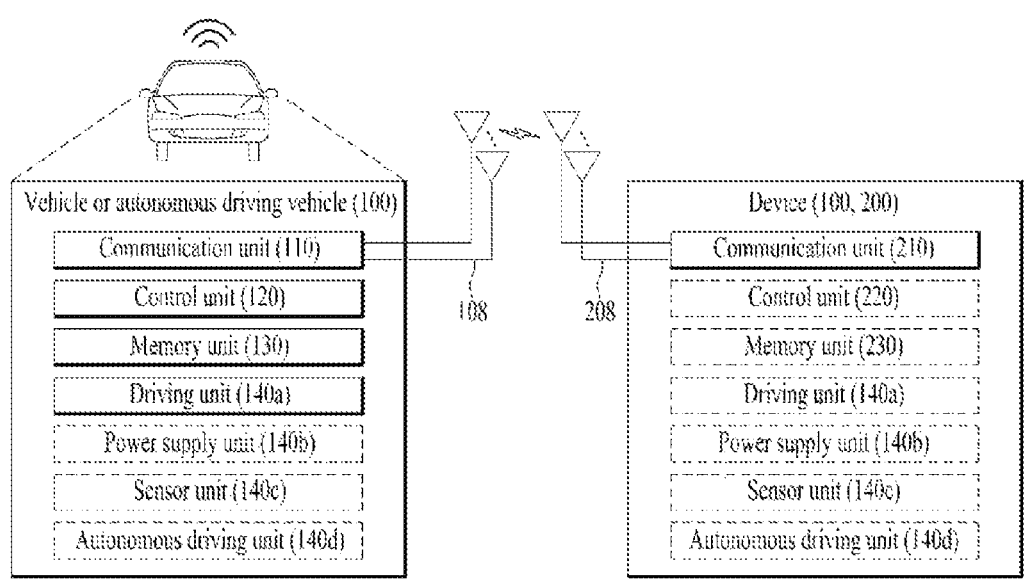

FIG. 15 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 15, a vehicle or autonomous driving vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an Electronic Control Unit (ECU). The driving unit 140*a* may cause the vehicle or the autonomous driving vehicle 100 to drive on a road. The driving unit 140*a* may include an engine, a motor, a powertrain, a wheel, a brake, a steering device, etc. The power supply unit 140*b* may supply power to the vehicle or the autonomous driving vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

Figure 16:
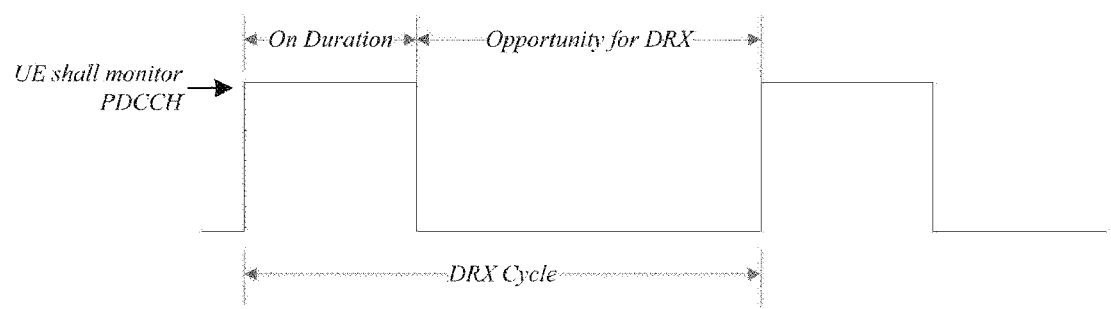
FIG. 16 illustrates discontinuous reception (DRX) operation applicable to the present disclosure.

FIG. 16 is a diagram illustrating a DRX operation of a UE according to an embodiment of the present disclosure.

The UE may perform a DRX operation in the aforedescribed/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 16, a DRX cycle includes an On Duration and an Opportunity for DRX. The DRX cycle defines a time interval between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in the present disclosure. On the contrary, when DRX is not configured, PDCCH monitoring/reception may be performed continuously in the time domain. For example, when DRX is not configured, PDCCH reception occasions (e.g., slots with PDCCH SSs) may be configured continuously in the present disclosure. Irrespective of whether DRX is configured, PDCCH monitoring may be restricted during a time period configured as a measurement gap.

Table 10 describes a DRX operation of a UE (in the RRC_CONNECTED state). Referring to Table 10, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 10

|  | Type of signals | UE procedure |
| --- | --- | --- |
| $1^{st}$ step | RRC signalling (MAC-CellGroupConfig) | Receive DRX configuration information |
| $2^{nd}$ Step | MAC CE ((Long) DRX command MAC CE) | Receive DRX command |
| $3^{rd}$ Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of transmitting a signal including uplink control information (UCI) by a user equipment (UE) in a wireless communication system, the method comprising:
    determining a number of resources for a plurality of UCIs; and
    transmitting, based on the determined number of resources, a single physical uplink channel in which the plurality of UCIs are multiplexed,
    wherein the determination of the number of resources for the plurality of UCIs comprises a first step of determining a number of hybrid automatic repeat request-acknowledgement (HARQ-ACK) resources and a second step of determining a number of channel state information (CSI)-part 1 resources after the first step, and
    wherein, based on that i) the plurality of UCIs include a first UCI with a priority index 0 and a second UCI with a priority index 1, ii) multiplexing of the first UCI with a priority index 0 and the second UCI the priority index 1 is configured, iii) the first UCI includes configured grant (CG)-UCI with the priority index 0, the CG-UCI including a hybrid automatic repeat request (HARQ) process number field, a redundancy version field and a new data indicator field and iv) the second UCI includes an HARQ-ACK with the priority index 1, the UE:
    determines a number of resources for the HARQ-ACK with the priority index 1 based on the first step, and
    determines a number of resources for the CG-UCI with the priority index 0 based in the second step, by taking the CG-UCI as a CSI-part 1.

2. The method according to claim 1, wherein the UE obtains encoded bits of the first UCI including the CG-UCI and encoded bits of the second UCI including the HARQ-ACK, respectively.

3. The method according to claim 1,
    wherein the first UCI further includes a second HARQ-ACK with the priority index 0, and wherein encoding of the first UCI includes joint encoding of the CG-UCI and the second HARQ-ACK.

4. The method according to claim 1, wherein the single physical uplink channel has the priority index 0.

5. The method of claim 1, wherein the single physical uplink channel is a configured grant-physical uplink shared channel (CG-PUSCH) with the priority index 0.

6. The method of claim 1, wherein joint encoding of the CG-UCI with the priority index 0 and the HARQ-ACK with the priority index 1, is not allowed.

7. The method of claim 6,
wherein the CG-UCI is jointly encoded with a specific HARQ-ACK with the priority index 0, and
wherein the CG-UCI and the HARQ-ACK included in the second UCI are separately encoded.

8. A non-transitory computer-readable medium storing instructions, when executed by a processor, that cause the processor to perform the method of claim 1.

9. A device for transmitting a signal including uplink control information (UCI) in a wireless communication system, the device comprising:
a memory configured to store instructions; and
a processor configured to perform operations by executing the instructions,
determining a number of resources for a plurality of UCIs; and
transmitting, based on the determined number of resources, a single physical uplink channel in which the plurality of UCIs are multiplexed,
wherein the determination of the number of resources for the plurality of UCIs comprises a first step of determining a number of hybrid automatic repeat request-acknowledgement (HARQ-ACK) resources and a second step of determining a number of channel state information (CSI)-part 1 resources after the first step, and
wherein, based on that i) the plurality of UCIs include a first UCI with a priority index 0 and a second UCI with a priority index 1, ii) multiplexing of the first UCI with the priority index 0 and the second UCI with the priority index 1 is configured, iii) the first UCI includes configured grant (CG)-UCI with the priority index 0, the CG-UCI including a hybrid automatic repeat request (HARQ) process number field, a redundancy version field and a new data indicator field and iv) the second UCI includes an HARQ-ACK with the priority index 1, the processor:
determines a number of resources for the HARQ-ACK with the priority index 1 based on the first step, and
determines a number of resources for the CG-UCI with the priority index 0 based on the second step, by taking the CG-UCI as a CSI-part 1.

10. The device according to claim 9, further comprising:
a transceiver configured to transmit or receive a wireless signal under control of the processor,
wherein the device is a user equipment (UE) in a wireless communication system.

11. A method of receiving a signal including uplink control information (UCI) by a base station (BS) in a wireless communication system, the method comprising:
determining a number of resources for a plurality of UCIs; and
receiving, based on the determined number of resources, a single physical uplink channel in which the plurality of UCIs are multiplexed,
wherein the determination of the number of resources for the plurality of UCIs comprises a first step of determining a number of hybrid automatic repeat request-acknowledgement (HARQ-ACK) resources and a second step of determining a number of channel state information (CSI)-part 1 resources after the first step, and
wherein, based on that i) the plurality of UCIs include a first UCI with a priority index 0 and a second UCI with a priority index 1, ii) multiplexing of the first UCI with the priority index 0 and the second UCI with the priority index 1 is configured, iii) the first UCI includes configured grant (CG)-UCI with the priority index 0, the CG-UCI including a hybrid automatic repeat request (HARQ) process number field, a redundancy version field and a new data indicator field and iv) the second UCI includes an HARQ-ACK with the priority index 1, the BS:
determines a number of resources for the HARQ-ACK with the priority index 1 based on the first step, and
determines a number of resources for the CG-UCI with the priority index 0 based on the second step, by taking the CG-UCI as a CSI-part 1.

12. A base station for receiving a signal including uplink control information (UCI), the base station comprising:
a transceiver; and
a processor configured to determine a number of resources for a plurality of UCIs, and to receive, based on the determined number of resources, a single physical uplink channel in which the plurality of UCIs are multiplexed,
wherein the determination of the number of resources for the plurality of UCIs comprises a first step of determining a number of hybrid automatic repeat request-acknowledgement (HARQ-ACK) resources and a second step of determining a number of channel state information (CSI)-part 1 resources after the first step, and
wherein the determination of the number of resources for the plurality of UCIs comprises a first step of determining a number of hybrid automatic repeat request-acknowledgement (HARQ-ACK) resources and a second step of determining a number of channel state information (CSI)-part 1 resources after the first step, and
wherein, based on that i) the plurality of UCIs include a first UCI with a priority index 0 and a second UCI with a priority index 1, ii) multiplexing of the first UCI with the priority index 0 and the second UCI with the priority index 1 is configured, iii) the first UCI includes configured grant (CG)-UCI with the priority index 0, the CG-UCI including a hybrid automatic repeat request (HARQ) process number field, a redundancy version field and a new data indicator field and iv) the second UCI includes an HARQ-ACK with the priority index 1, the processor:
determines a number of resources for the HARQ-ACK with the priority index 1 based on the first step, and
determines a number of resources for the CG-UCI with the priority index 0 based on the second step, by taking the CG-UCI as a CSI-part 1.

* * * * *